(12) United States Patent
Das Sharma et al.

(10) Patent No.: US 12,499,019 B2
(45) Date of Patent: Dec. 16, 2025

(54) RETIMERS TO EXTEND A DIE-TO-DIE INTERCONNECT

(71) Applicant: Intel Corporation, Santa Clara, CA (US)

(72) Inventors: Debendra Das Sharma, Saratoga, CA (US); Swadesh Choudhary, Mountain View, CA (US); Sridhar Muthrasanallur, Bengaluru (IN); Narasimha Lanka, Dublin, CA (US); Zuoguo Wu, San Jose, CA (US); Gerald Pasdast, San Jose, CA (US); Lakshmipriya Seshan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 460 days.

(21) Appl. No.: 17/855,720

(22) Filed: Jun. 30, 2022

(65) Prior Publication Data

US 2022/0334932 A1     Oct. 20, 2022

(30) Foreign Application Priority Data

Jan. 27, 2022   (IN) .............................. 202241004437

(51) Int. Cl.
*G06F 11/00*  (2006.01)
*G06F 11/08*  (2006.01)
(Continued)

(52) U.S. Cl.
CPC .......... *G06F 11/2007* (2013.01); *G06F 11/08* (2013.01); *G06F 13/1636* (2013.01);
(Continued)

(58) Field of Classification Search
CPC .. G06F 11/2007; G06F 11/08; G06F 11/0745; G06F 11/3051; G06F 13/1636;
(Continued)

(56) References Cited

U.S. PATENT DOCUMENTS

| | | | |
|---|---|---|---|
| 2015/0103822 A1 | 4/2015 | Gianchandani et al. | |
| 2017/0004098 A1 | 1/2017 | Sharma et al. | |

(Continued)

FOREIGN PATENT DOCUMENTS

| | | | |
|---|---|---|---|
| CN | 112463490 A | 3/2021 | |
| JP | 2008522526 A | 6/2008 | |

(Continued)

OTHER PUBLICATIONS

PCT International Search Report and Written Opinion in in PCT International Application Serial No. PCT/US2022/054094 mailed on Apr. 21, 2023 (13 pages).

(Continued)

*Primary Examiner* — Joseph D Manoskey
(74) *Attorney, Agent, or Firm* — Alliance IP, LLC

(57) ABSTRACT

A retimer includes a first port to couple to a die over a first interconnect, where the first interconnect includes a defined set of lanes and utilizes a first communication technology, and the die is located on a first package with the retimer. The retimer further includes a second port to couple to another retimer over a second interconnect, where the second interconnect utilizes a different second communication technology, and the second retimer is located on a different, second package to facilitate a longer reach communication channel.

20 Claims, 25 Drawing Sheets

(51) Int. Cl.
*G06F 11/20* (2006.01)
*G06F 13/16* (2006.01)
*G06F 13/40* (2006.01)
*G06F 13/42* (2006.01)
*H01L 23/00* (2006.01)
*H01L 23/538* (2006.01)
*H01L 25/065* (2023.01)

(52) U.S. Cl.
CPC ........ *G06F 13/405* (2013.01); *G06F 13/4221* (2013.01); *G06F 13/4273* (2013.01); *G06F 2213/0024* (2013.01); *G06F 2213/0026* (2013.01); *H01L 23/5381* (2013.01); *H01L 23/5385* (2013.01); *H01L 23/5386* (2013.01); *H01L 24/16* (2013.01); *H01L 25/0655* (2013.01); *H01L 2224/16225* (2013.01); *H01L 2924/1431* (2013.01); *H01L 2924/1434* (2013.01)

(58) Field of Classification Search
CPC ............... G06F 13/405; G06F 13/4221; G06F 13/4273; G06F 2213/0024; G06F 2213/0026; H01L 23/5381; H01L 23/5385; H01L 23/5386; H01L 24/16; H01L 25/0655; H01L 2224/16225; H01L 2924/1431; H01L 2924/1434
See application file for complete search history.

(56) References Cited

U.S. PATENT DOCUMENTS

| | | | |
|---|---|---|---|
| 2017/0017604 A1* | 1/2017 | Chen | G06F 11/3027 |
| 2017/0315887 A1 | 11/2017 | Olson et al. | |
| 2018/0234128 A1 | 8/2018 | Elsherbini et al. | |
| 2018/0253398 A1* | 9/2018 | Wu | G06F 15/173 |
| 2018/0267850 A1* | 9/2018 | Froelich | G06F 13/14 |
| 2019/0007310 A1 | 1/2019 | Das Sharma et al. | |
| 2019/0065426 A1 | 2/2019 | Sharma et al. | |
| 2019/0171607 A1 | 6/2019 | Chen et al. | |
| 2019/0205270 A1* | 7/2019 | Leung | G06F 1/10 |
| 2019/0258600 A1* | 8/2019 | Das Sharma | G06F 11/0778 |
| 2019/0294579 A1 | 9/2019 | Das Sharma | |
| 2020/0012555 A1* | 1/2020 | Das Sharma | H04L 1/0083 |
| 2020/0327084 A1 | 10/2020 | Choudhary et al. | |
| 2020/0327088 A1 | 10/2020 | Choudhary et al. | |
| 2020/0394150 A1* | 12/2020 | Lanka | G06F 13/4226 |
| 2021/0075302 A1 | 3/2021 | Beniakar et al. | |
| 2021/0089421 A1 | 3/2021 | Sharma et al. | |
| 2021/0263879 A1 | 8/2021 | Li et al. | |
| 2021/0271537 A1* | 9/2021 | Gong | G06F 13/4295 |
| 2022/0012140 A1 | 1/2022 | Sharma et al. | |
| 2022/0334932 A1 | 10/2022 | Sharma et al. | |

FOREIGN PATENT DOCUMENTS

| | | |
|---|---|---|
| JP | 2017506010 A | 2/2017 |
| JP | 2021087216 A | 6/2021 |
| WO | 2006059277 A2 | 6/2006 |

OTHER PUBLICATIONS

Japan Patent Office, Notice of Reasons for Rejection issued in JP Patent Application No. 2023-573349, mailed Jun. 24, 2025; 8 pages including English translation.

* cited by examiner

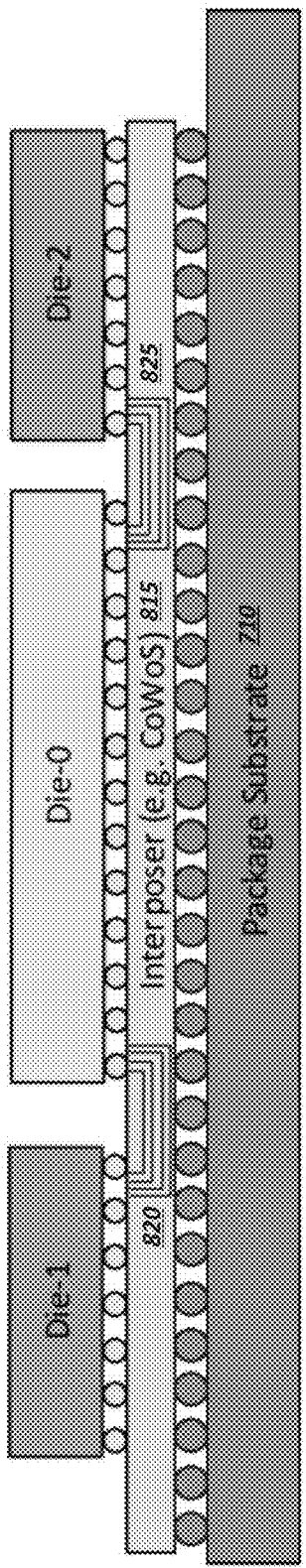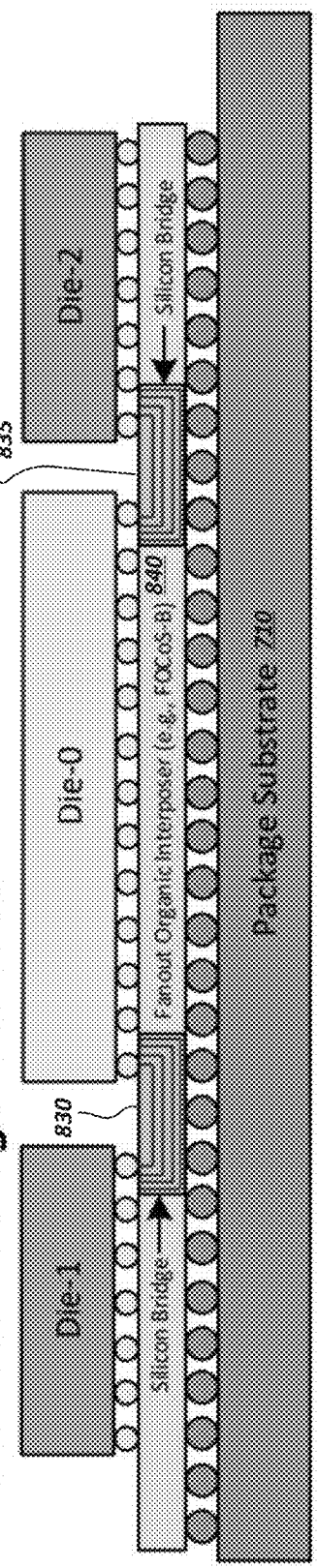
FIG. 8B
FIG. 8C

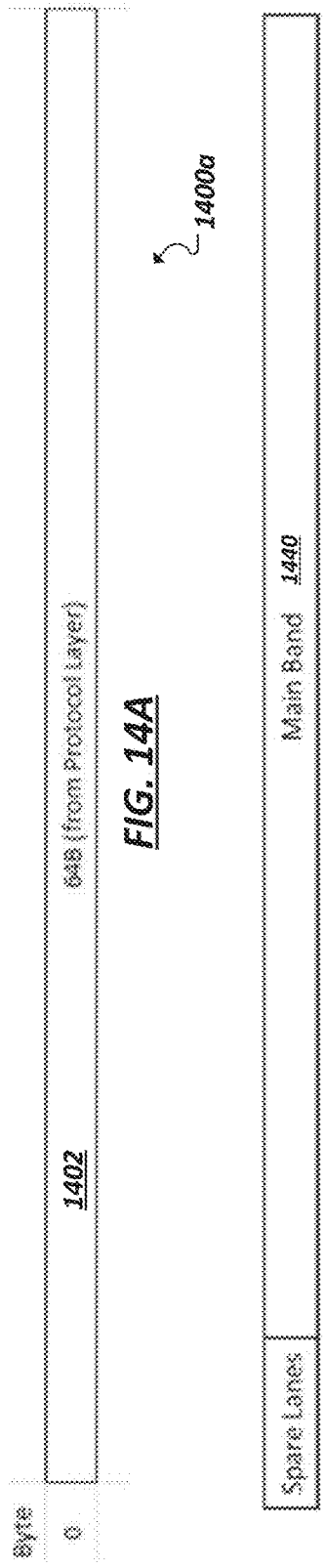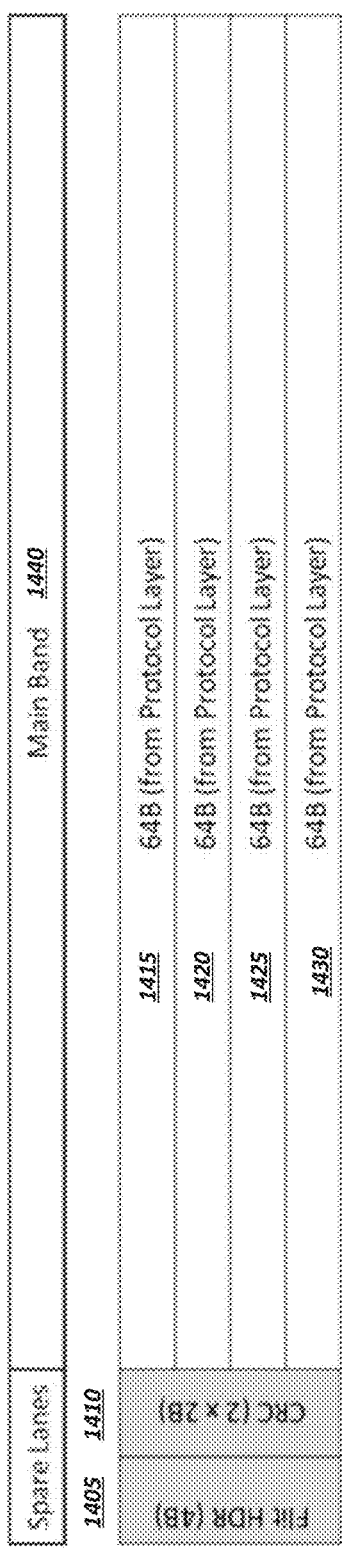
FIG. 14A
FIG. 14B
FIG. 14C

UCIe D2D/PHY register block (Remote agent indicated protocol/link capabilities, Negotiation status, etc.)

Region Header — 00h

Retimer Test/Compliance Register block

Region Header — 00h

Retimer Implementation-specific Register block

Region Header — 00h

| SB Mailbox Address 1905 | | |
|---|---|---|
| SB Mailbox Data 1910 | | |
| Mailbox Semaphore 1920 | Reserved | Mailbox Control 1915 |

| 7:2 Reserved | Gnt1 (RWIC) | Gnt0 (RWIC) | 7:2 Reserved | Req1 (RW) | Req0 (RW) |
|---|---|---|---|---|---|

| Bit | Attributes | Description |
|---|---|---|
| 2:0 | RO | Reserved |
| 5:3 | RO | Register Block Identifier - identifies the type of UCIe register blocks. Defined encodings are:<br>• 0h UCIe D2D/PHY Register Block<br>• 1h UCIe Test/Compliance Register Block<br>• 2h Implementation specific register block<br>• Others Reserved<br><br>The same register block identifier value cannot be repeated in multiple Register Locator entries. |
| 63:6 | RO | Reserved |

RETIMERS TO EXTEND A DIE-TO-DIE INTERCONNECT

RELATED APPLICATIONS

This application claims benefit under 35 U.S.C. 119 to Indian Provisional Patent Application Serial No. 202241004437, filed Jan. 27, 2022, entitled "On-Package Die-to-Die (D2D) Retimer," which is incorporated by reference herein in its entirety.

FIELD

This disclosure pertains to computing systems, and in particular (but not exclusively) to physical interconnects and related link protocols.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 8A-8D illustrates simplified block diagram of example package configurations.

FIGS. 14A-14C are representations of example UCIe data formats.

FIGS. 18A-18D are representations of example registers for use in an example retimer.

FIGS. 19A-19B are representations of data structures for use in facilitating register accessed by software.

FIG. 20 is a representation of an example register locator register.

DETAILED DESCRIPTION

Figure 1:
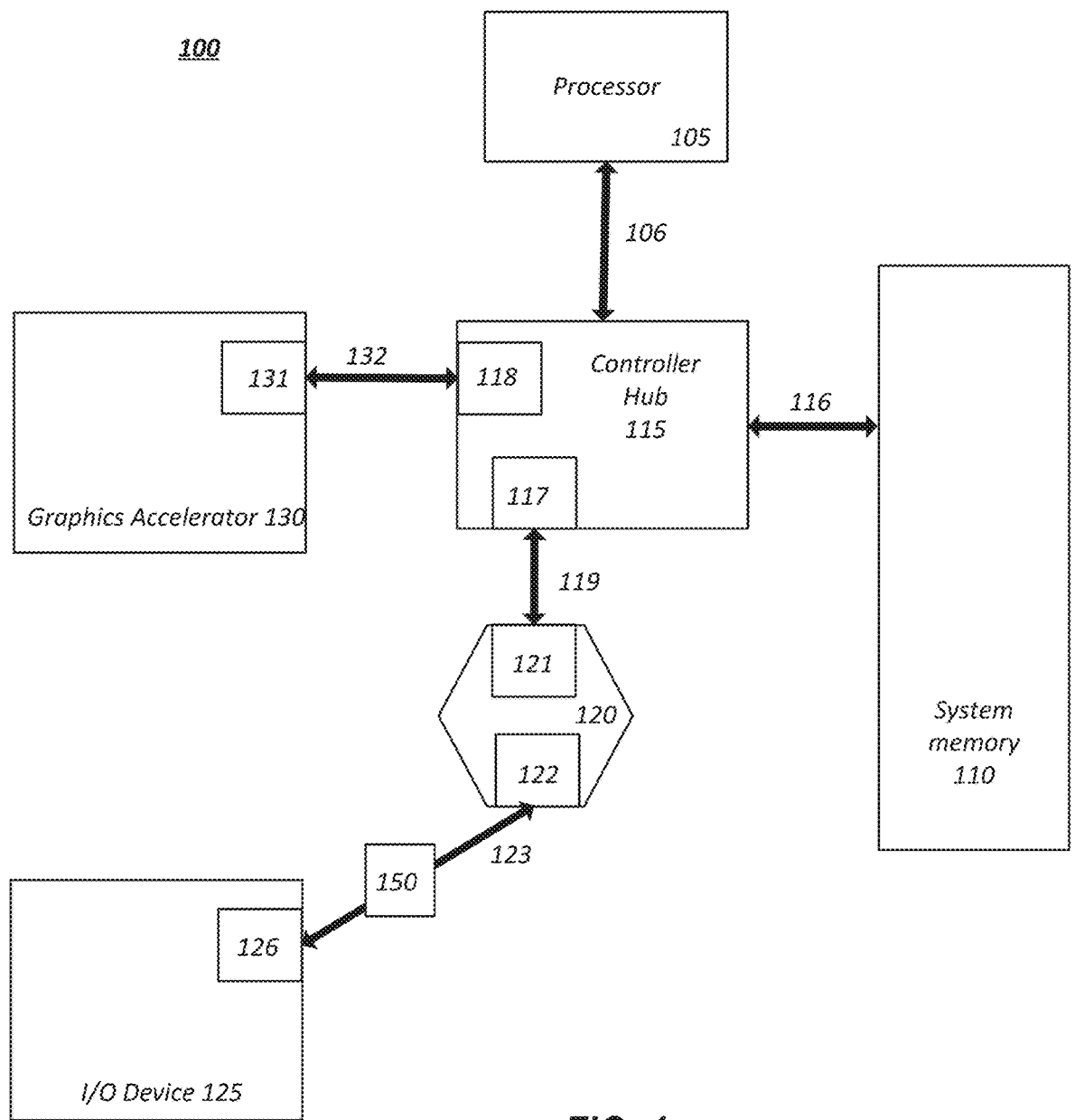
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the solutions provided in the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. The techniques and teachings of embodiments described herein may also be applied at the server level, including rack scale server platforms, blade server platforms, and other server architectures. Moreover, the apparatus', methods, and systems described herein are not limited to physical computing devices, but may also relate to software emulations and simulations of physical systems, such as those architectures discussed in the examples below. As will become readily apparent in the description below, the embodiments of methods, apparatus', and systems described herein (whether in reference to hardware, firmware, software, or a combination thereof) are important in enabling computing platforms to handle increasing data speeds while balancing power usage and physical footprint, among other example considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the solutions described herein.

Modern interconnect fabric architectures enable components and devices from different vendors to inter-operate in an open architecture, spanning multiple market segments; Clients (Desktops and Mobile), Servers (Standard and Enterprise), and Embedded and Communication devices. For instance, high performance, general purpose I/O interconnect protocols (e.g., Peripheral Component Interconnect Express (PCIe)) have been defined for a wide variety of future computing and communication platforms. Such protocols and corresponding architectures may take advantage of advances in point-to-point interconnects, switch-based technology, and packetized protocol to deliver new levels of performance and features. As an example, Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. Interconnect protocols and features discussed below may be utilized to implement the fabric and links coupling the set of components introduced here in FIG. 1.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 may be implemented as a root hub, root complex, or root controller in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
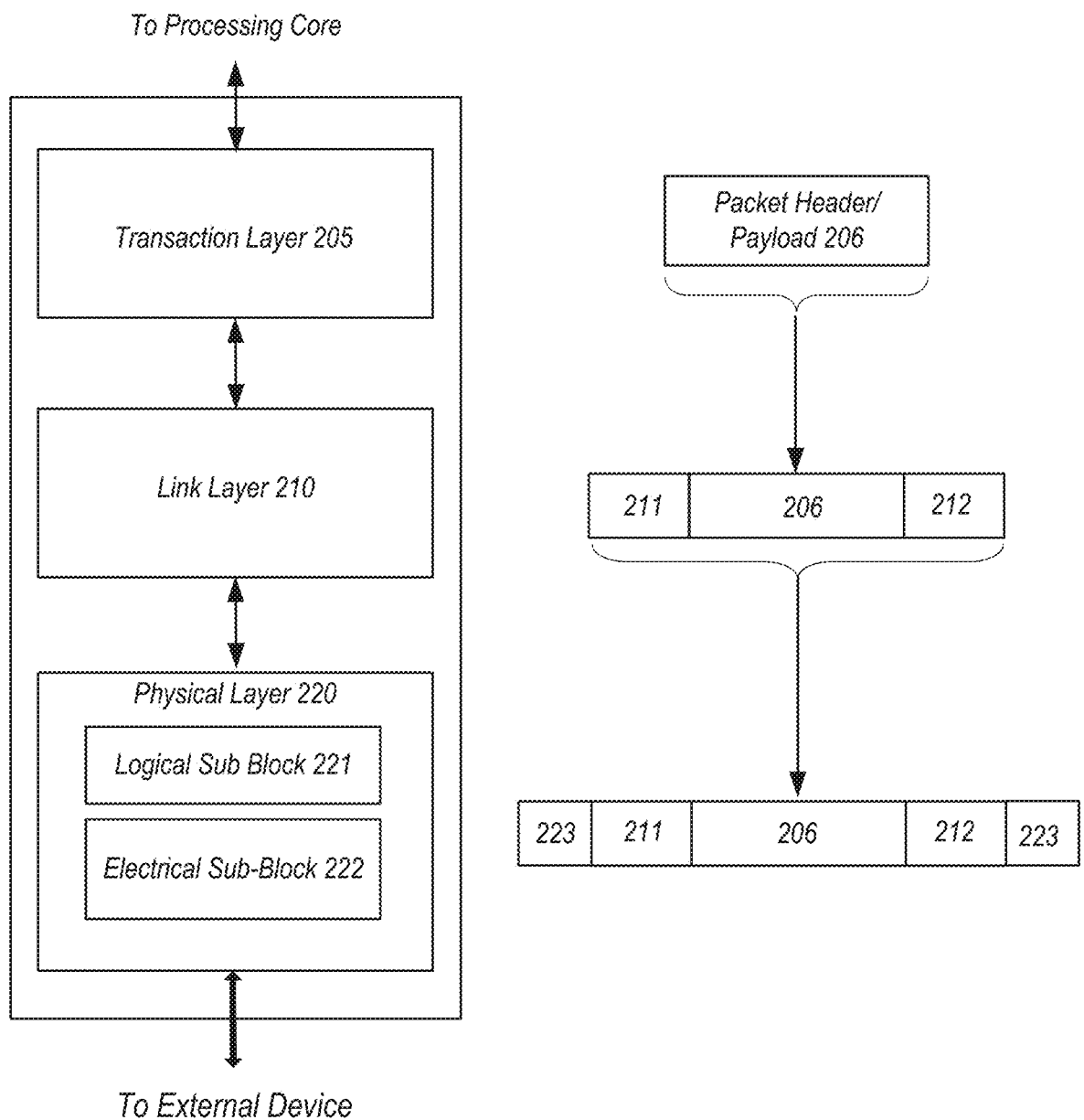
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a Compute Express Link (CXL) stack, or other high performance computing interconnect stack, or other layered stack. Although the discussion immediately below in reference to FIGS. 1-4 are in relation to a general purpose interconnect protocol stack (e.g., PCIe), the same concepts may be applied to other interconnect stacks. In one embodiment, protocol stack 200 is a protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

A protocol may use packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. For instance, a protocol may implement split transactions, i.e. transactions with request and response separated by time, allowing a link to carry other traffic while the target device gathers data for the response. In some implementations, flow control may be implemented using a credit-based flow control scheme. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the devices supporting the protocol. Transactions to the configuration space include read requests and write requests. Message space transactions (or, simply messages) are defined to support in-band communication between protocol agents implementing the protocols on the devices. Therefore, in one embodiment, transaction layer 205 assembles packet header/payload 206.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to physical transmission medium connecting the transmitter to another external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. In other instances, a 128b/130b encoding may be employed, while in still other implementations, flit-based transmission may be utilized, among other examples. In one example, special symbols are used to frame a packet with frames 223. In addition, in one example, the receiver also provides a symbol clock recovered from the incoming serial stream.

A transmission medium may implement a transmission path for transmitting data, such as a transmission line, a copper line, an optical line, a wireless communication channel, an infrared communication link, or other communication path. A connection between two devices, is referred to as a link. A link may be implemented using one or multiple constituent transmission paths, or lanes. To scale bandwidth, a link may aggregate multiple lanes denoted by xN, where N is any supported Link width, such as 1, 2, 4, 8, 12, 16, 32, 64, or wider. In some implementations, differential signaling may be employed, with a differential pair referring to two transmission paths to transmit differential signals. As an example, in a differential pair, when a first line in the pair toggles from a low voltage level to a high voltage level, i.e. a rising edge, the other line in the pair drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

As stated above, although transaction layer 205, link layer 210, and physical layer 220 are discussed in reference to a specific embodiment (e.g., a traditional PCIe protocol stack), a layered protocol stack is not so limited. In fact, any layered protocol may be included/implemented. As an example, an port/interface may include logic implemented in hardware circuitry and/or firmware to implement various layers in a layered protocol, such as: (1) a first layer to assemble packets (e.g., a transaction or protocol layer); a second layer to sequence packets (e.g., a link or data link layer); and a third layer to transmit the packets (e.g., a physical layer), including layers of protocols discussed more particularly below.

In some implementations, interconnect protocols may implement cache-coherent links. As one example, Ultra Path Interconnect™ (UPI™) may be utilized in high performance computing platforms, such as workstations or servers, including in systems where PCIe or another interconnect protocol is typically used to connect processors, accelerators, I/O devices, and the like. However, UPI is not so limited. Instead, UPI may be utilized in any of the systems or platforms described herein. Furthermore, the individual ideas developed may be applied to other interconnects and platforms, such as PCIe, MIPI, QPI, etc.

Figure 3:
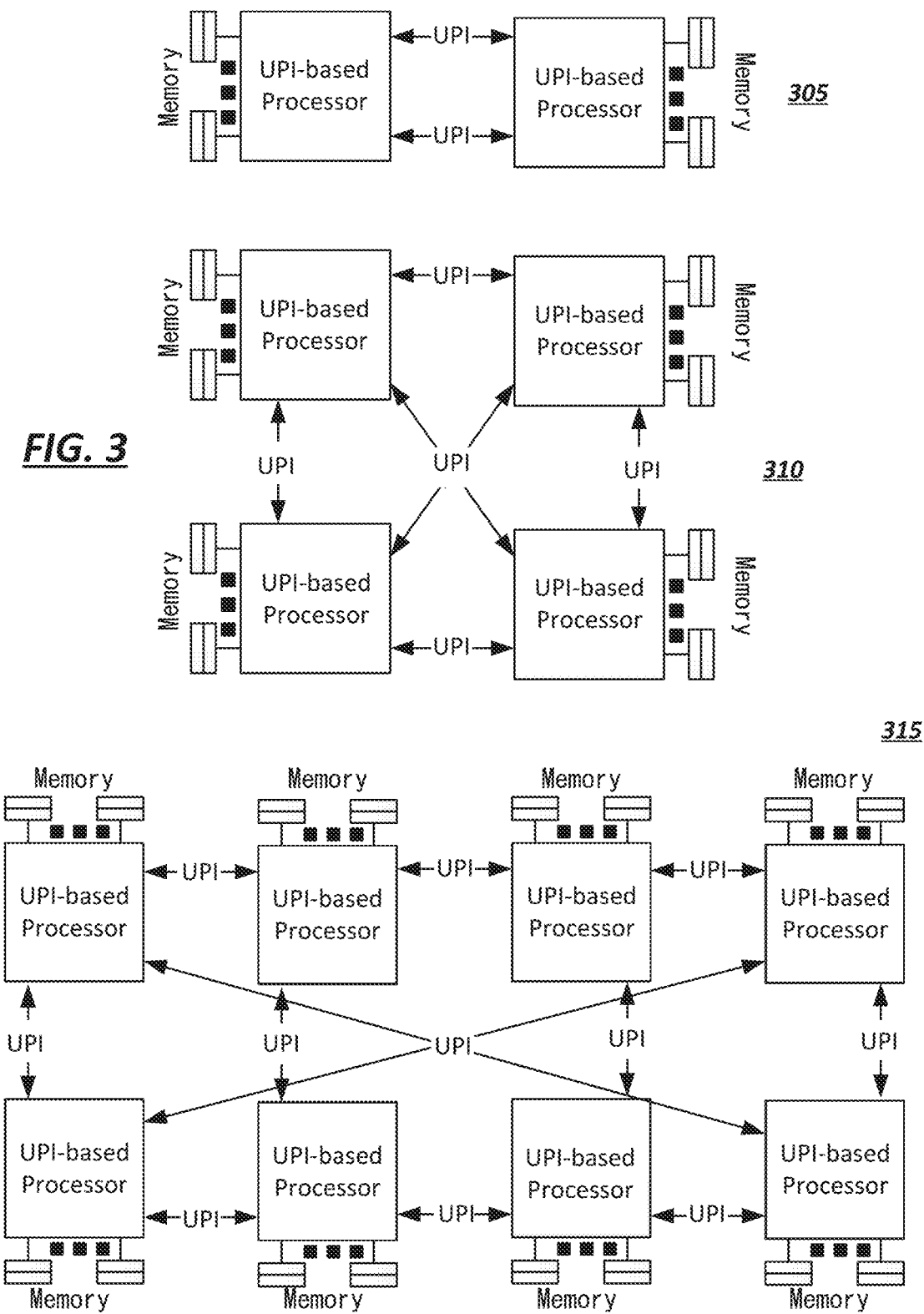
FIG. 3 illustrates embodiments of potential high performance, processor-to-processor interconnect configurations.

To support multiple devices, in one example implementation, UPI can be Instruction Set Architecture (ISA) agnostic (i.e. UPI is able to be implemented in multiple different devices). In another scenario, UPI may also be utilized to connect high performance I/O devices, not just processors or accelerators. For example, a high performance PCIe device may be coupled to UPI through an appropriate translation bridge (i.e. UPI to PCIe). Moreover, the UPI links may be utilized by many UPI based devices, such as processors, in various ways (e.g. stars, rings, meshes, etc.). Indeed, interconnect protocols, such as UPI and others discussed herein, may be used to facilitate interconnections between dies or packages. For instance, FIG. 3 illustrates example implementations of various potential multi-socket configurations. A two-socket configuration 305, as depicted, can include two links; however, in other implementations, one link may be utilized. For larger topologies, any configuration may be utilized as long as an identifier (ID) is assignable and there is some form of virtual path, among other additional or substitute features. As shown, in one example, a four socket configuration 310 has a link from each processor to another. But in the eight socket implementation shown in configuration 315, not every socket is directly connected to each other through a respective link. However, if a virtual path or channel exists between the processors, the configuration is supported. A range of supported processors includes 2-32 in a native domain. Higher numbers of processors may be reached through use of multiple domains or other interconnects between node controllers, among other examples.

As with other interconnect architectures, the UPI architecture includes a definition of a layered protocol architecture, including in some examples, protocol layers (coherent, non-coherent, and, optionally, other memory based protocols), a routing layer, a link layer, and a physical layer. In some implementations, respective layers in the protocol stack may construct and/or deal with their own level of granularity or quantum of information (e.g., the protocol layer with packets, the link layer with flits, the physical layer with phits or symbols, among other examples) Note that a packet, in some embodiments, may include partial flits, a single flit, or multiple flits based on the implementation.

In another example interconnect protocol, a Compute Express Link (CXL) interconnect protocol may be utilized to provide an improved, high-speed CPU-to-device and CPU-to-memory interconnect designed to accelerate next-generation data center performance, among other application. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 4:
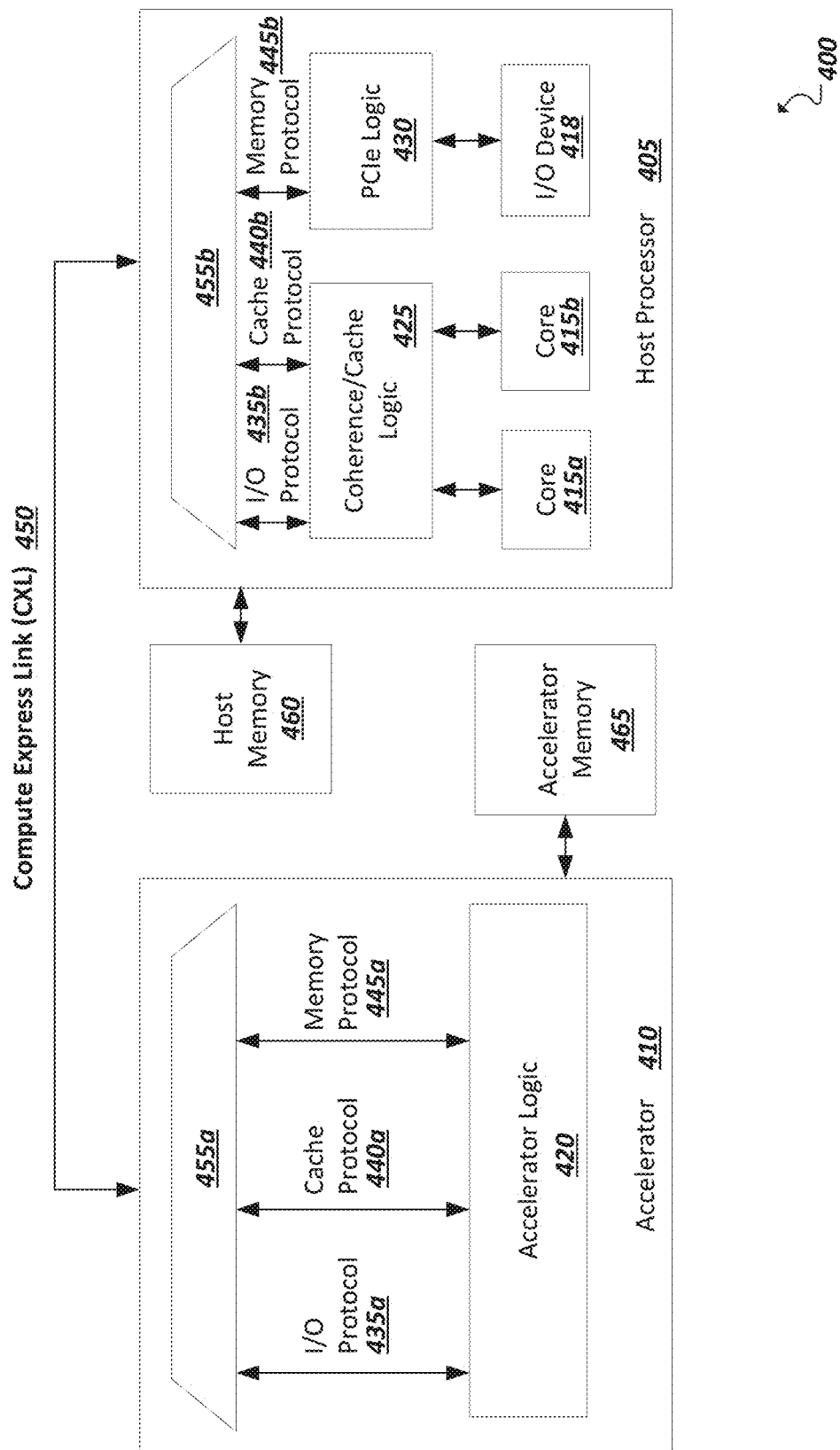
FIG. 4 illustrates an embodiment of a layered protocol stack associated with an interconnect.

Turning to FIG. 4, a simplified block diagram 400 is shown illustrating an example system utilizing a CXL link 450. For instance, the link 450 may interconnect a host processor 405 (e.g., CPU) to an accelerator device 410. In this example, the host processor 405 includes one or more processor cores (e.g., 415a-b) and one or more I/O devices (e.g., 418). Host memory (e.g., 460) may be provided with the host processor (e.g., on the same package or die). The accelerator device 410 may include accelerator logic 420 and, in some implementations, may include its own memory (e.g., accelerator memory 465). In this example, the host processor 405 may include circuitry to implement coherence/cache logic 425 and interconnect logic (e.g., PCIe logic 430). CXL multiplexing logic (e.g., 455a-b) may also be provided to enable multiplexing of CXL protocols (e.g., I/O protocol 435a-b (e.g., CXL.io), caching protocol 440a-b (e.g., CXL.cache), and memory access protocol 445a-b (CXL.mem)), thereby enabling data of any one of the supported protocols (e.g., 435a-b, 440a-b, 445a-b) to be sent, in a multiplexed manner, over the link 450 between host processor 405 and accelerator device 410.

In some implementations of CXL, a Flex Bus port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 5:
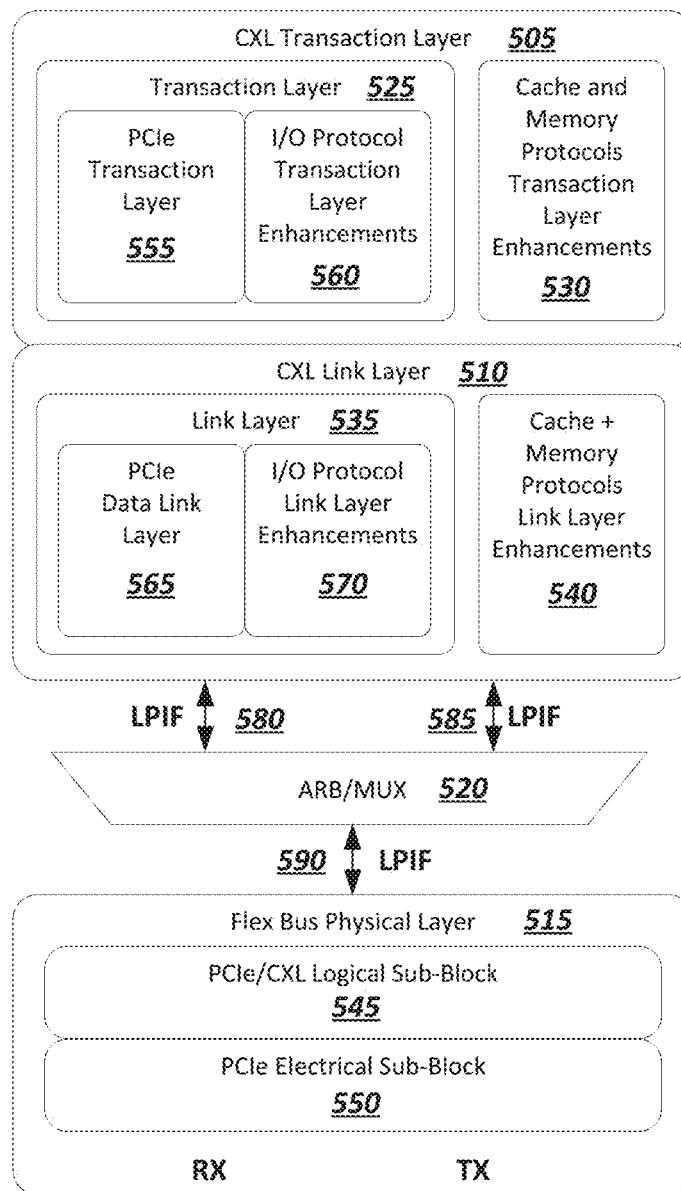
FIG. 5 illustrates a simplified block diagram of an example computing system utilizing a link compliant with a Compute Express Link (CXL)-based protocol.

FIG. 5 is a simplified block diagram illustrating an example port architecture 500 (e.g., Flex Bus) utilized to implement CXL links. For instance, Flex Bus architecture may be organized as multiple layers to implement the multiple protocols supported by the port. For instance, the port may include transaction layer logic (e.g., 505), link layer logic (e.g., 510), and physical layer logic (e.g., 515) (e.g., implemented all or in-part in circuitry). For instance, a transaction (or protocol) layer (e.g., 505) may be subdivided into transaction layer logic 525 that implements a PCIe transaction layer 555 and CXL transaction layer enhancements 560 (for CXL.io) of a base PCIe transaction layer 555, and logic 530 to implement cache (e.g., CXL.cache) and memory (e.g., CXL.mem) protocols for a CXL link. Similarly, link layer logic 535 may be provided to implement a base PCIe data link layer 565 and a CXL link layer (for CXl.io) representing an enhanced version of the PCIe data link layer 565. A CXL link layer 510 may also include cache and memory link layer enhancement logic 540 (e.g., for CXL.cache and CXL.mem).

Continuing with the example of FIG. 5, a CXL link layer logic 510 may interface with CXL arbitration/multiplexing (ARB/MUX) logic 520, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 515 based on a PCIe physical layer (e.g., PCIe electrical PHY 550). For instance, a Flex Bus physical layer may be implemented as a converged logical physical layer 545 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., ×16, ×8, ×4, ×2, ×1, etc.). In PCIe mode, links implemented by the port 500 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

In some implementations, an interface may be provided to couple circuitry or other logic (e.g., an intellectual property (IP) block or other hardware element) implementing a link layer (e.g., 510) to circuitry or other logic (e.g., an IP block or other hardware element) implementing at least a portion of a physical layer (e.g., 515) of a protocol. For instance, an interface based on a Logical PHY Interface (LPIF) specification to define a common interface between a link layer controller, module, or other logic and a module implementing a logical physical layer ("logical PHY" or "logPHY") to facilitate interoperability, design and validation re-use between one or more link layers and a physical layer for an interface to a physical interconnect, such as in the example of FIG. 5. Additionally, as in the example of FIG. 5, an interface may be implemented with logic (e.g., 535, 540) to simultaneously implement and support multiple protocols. Further, in such implementations, an arbitration and multiplexer layer (e.g., 520) may be provided between the link layer (e.g., 510) and the physical layer (e.g., 515). In some implementations, each block (e.g., 515, 520, 535, 540) in the multiple protocol implementation may interface with the other block via an independent LPIF interface (e.g., 580, 585, 990). In cases where bifurcation is supported, each bifurcated port may likewise have its own independent LPIF interface, among other examples.

While examples discussed herein may reference the use of LPIF-based link layer-logical PHY interfaces, it should be appreciated that the details and principles discussed herein may be equally applied to non-LPIF interfaces. Likewise, while some examples may reference the use of common link layer-logical PHY interfaces to couple a PHY to controllers implement CXL or PCIe, other link layer protocols may also make use of such interfaces. Similarly, while some references may be made to Flex Bus physical layers, other physical layer logic may likewise be employed in some implementations and make use of common link layer-logical PHY interfaces, such as discussed herein, among other example variations that are within the scope of the present disclosure.

Traditional die-to-die interconnects are either vendor-specific or application specific (e.g., HBM Connect is used to connect memory on-package). Some die-to-die interconnects (e.g., MB from Intel, HBI and BoW from OCP consortium) only define a physical layer and do not provide a mechanism for ensuring interoperability across dies. Indeed, current solutions do not exist for implementing a general-purpose die-to-die interconnect that can be used for seamless interoperability between dies and can provide open innovation slots on the package, which engineers can innovate around. An improved interconnect architecture is introduced herein to implement a standardized die-to-die interface through the Universal Chiplet Interconnect Express (UCIe) protocol. Not only does UCIe enable a solution for general-purpose die-to-die interconnects for the on-package and off-package coupling of dies, but the standardization of the interface enable the interconnection of different devices from different vendors and different fabs across different technology nodes using different packaging choices to improve upon existing computing system and implement new systems.

UCIe offers high-bandwidth, low-latency, power-efficient, and cost-effective on-package connectivity between chiplets. It addresses the projected growing demands of compute, memory, storage, and connectivity across the entire compute continuum spanning cloud, edge, enterprise, 5G, automotive, high-performance computing, and hand-held segments. While Moore's Law has held true, allowing for increasingly compact and powerful computing blocks, the increasing on-package integration of multiple dies in mainstream commercial offerings such as client CPUs, server CPUs, GP-GPUs, etc. has resulted in larger die sizes to meet growing performance demands. This phenomenon, however, has resulted in designs running running up against the die reticle limit. Examples include multi-core CPUs with core count in the hundreds or very large fanout switches. Even when a die can fit within the reticle limit, multiple smaller dies connected in a package may be preferable for yield optimization as well as die reuse across multiple market segments. On-package connectivity of identical dies enables these scale-up applications. Additionally, chiplet integration on package also enables a designer to make different trade-offs for different market segments by choosing different numbers and types of dies. For example, one can choose different numbers of compute, memory, and I/O dies depending on the need of the segment. One does not need to do a different die design for different segments, resulting in lower product SKU cost.

On-package integration of chiplets enables a fast and cost-effective way to provide bespoke solutions. For example, different usages may need different acceleration capability but with the same cores, memory, and I/O. It also allows the co-packaging of dies where the optimal process node choice is made based on the functionality. For example, memory, logic, analog, and co-packaged optics each needs a different process technology which can be packaged with chiplets. Since package traces are short and offers dense routing, applications requiring high bandwidth such as memory access (e.g., High Bandwidth Memory), are implemented as on-package integration.

UCIe is an open, multi-protocol capable, on-package interconnect standard for connecting multiple dies on the same package. UCIe enables the development of a vibrant ecosystem supporting disaggregated die architectures which can be interconnected using UCIe. UCIe supports multiple protocols, such as PCIe, CXL, Advanced Extensible Interface™ (AXI), UPI, and other others, as well as a raw mode that can be used to map any protocol of choice (as long as both link partners support it) on top of a common physical and link layer. UCIe may additionally encompass the elements for system on chip (SoC) construction, such as the application layer and the form-factors relevant to the package (e.g., bump location, power delivery, thermal solution, etc.), among other features. The features of UCIe act to ensure interoperability across a wide range of devices having different performance characteristics. A well-defined debug and compliance mechanism is provided to ensure interoperability. UCIe may additionally allow support of devices in a backward compatible manner.

While UCIe supports a wide range of usage models, a subset are provided here as illustrative examples. As noted above, some protocols may be mapped explicitly onto UCIe, such as PCIe and CXL. Such protocols may be mapped onto a UCIe flit format, including the raw mode. As an example, widely used protocols such as PCIe and CXL may be mapped onto UCIe to more on-package integration, for instance, by replacing the PCIe SERDES PHY and the PCIe/CXL Logical PHY along with the link level retry, improve power, and enhance performance, among other example features. UCIe raw mode is protocol-agnostic and enables other protocols to be mapped ad hoc by a device, while allowing usages such as integrating a stand-alone SERDES/transceiver tile (e.g., ethernet) on-package, among other example features.

Figure 6:
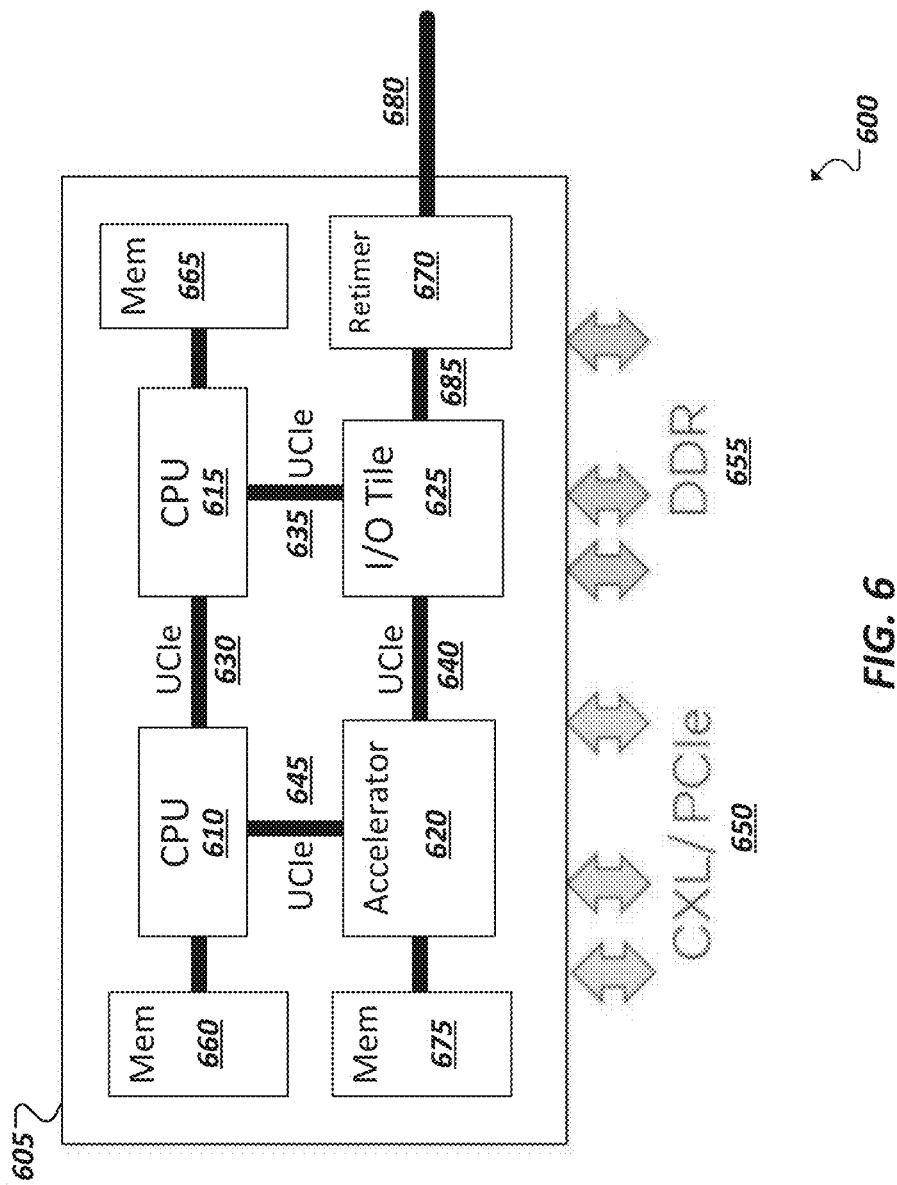
FIG. 6 illustrates a simplified block diagram of an example system on chip (SoC) package.

FIG. 6 is a simplified block diagram 600 illustrating an example implementation of an SoC package 605 including a number of processor dies (e.g., 610, 615), accelerator die(s) (e.g., 620), and input/output (I/O) tiles (e.g., 625) interconnected using a number of UCIe links (e.g., 630, 635, 640, 645). In some implementations, an accelerator 620 and/or I/O tile 625 can be connected to CPU device(s) 610, 615 using CXL transactions running on UCIe to thereby leverage the I/O, coherency, and memory protocols of CXL. The I/O tile can provide the external CXL, PCIe and DDR pins (e.g., 650, 655) of the package 605. The accelerator can also be connected to the CPU using PCIe transactions running on UCIe. The CPU-to-CPU connectivity on-package can also use the UCIe interconnect, running coherency protocols, among other examples. In some implementations, all component on an example SoC package may be interconnected using UCIe links. In other instances, one or more blocks (e.g., memory blocks 660, 665, 675) may be connected using other protocols or links (e.g., DDR, etc.), among other example implementations. Further, as shown in FIG. 6, a UCIe link (e.g., 685) may be utilized to couple to an on-package retimer device 670. The retimer 670 may be utilized to extend the physical reach of a UCIe link (e.g., 680) and enable off-package connections (e.g., to other components on other packages), among other example components.

Figure 7:
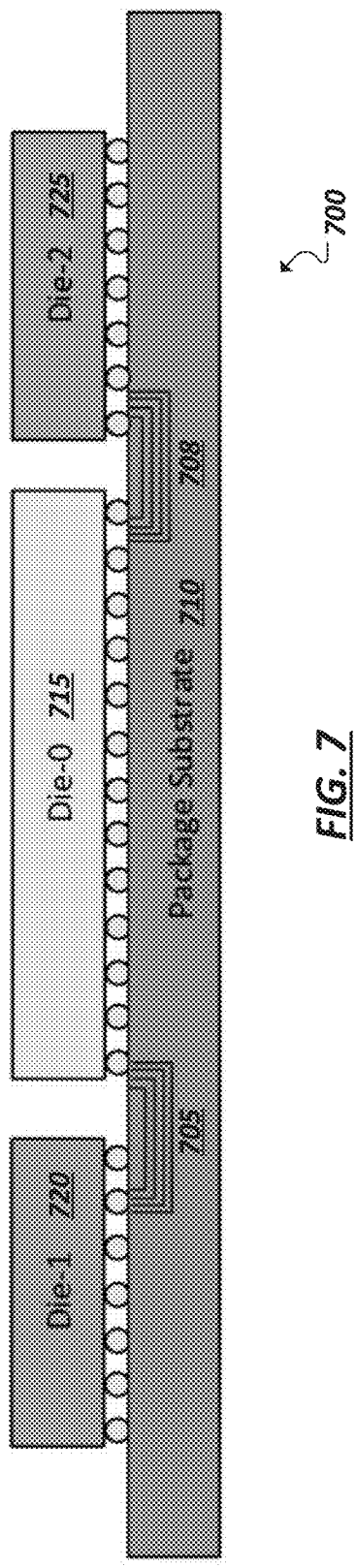
FIG. 7 illustrates simplified block diagram of a two-dimensional package substrate and interconnect coupling two or more device.

A variety of packages may support UCIe links. For instance, a standard two-dimensional (2D) package may be utilized, as well 2.5D and 3D advanced packaging options, among other examples. FIG. 7 is a simplified block diagram illustrating an example application using a standard 2D package. A 2D package may be used for low cost and long reach (e.g., 10 mm to 25 mm) interconnects using traces 705, 708 on organic package/substrate 710, while still providing significantly better BER characteristics compared to off-package SERDES. As shown in FIG. 7, a first die 715 may be coupled to a second die 720 and a third die 725 by respective links implemented using traces (e.g., 705, 708) on the substrate 710.

Figure 8A:
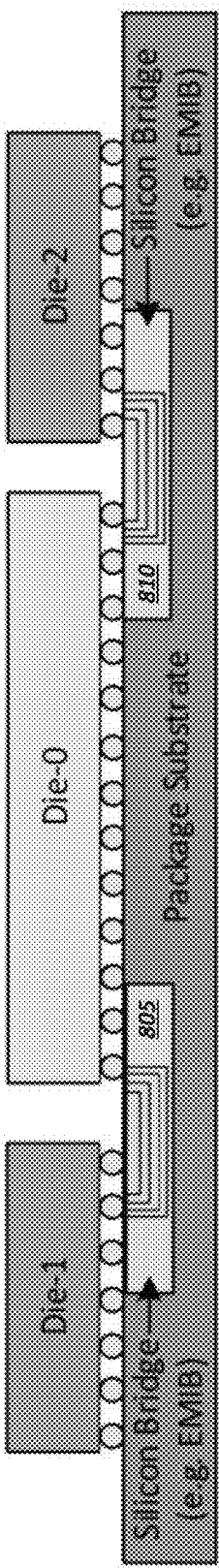
Figure 8D:
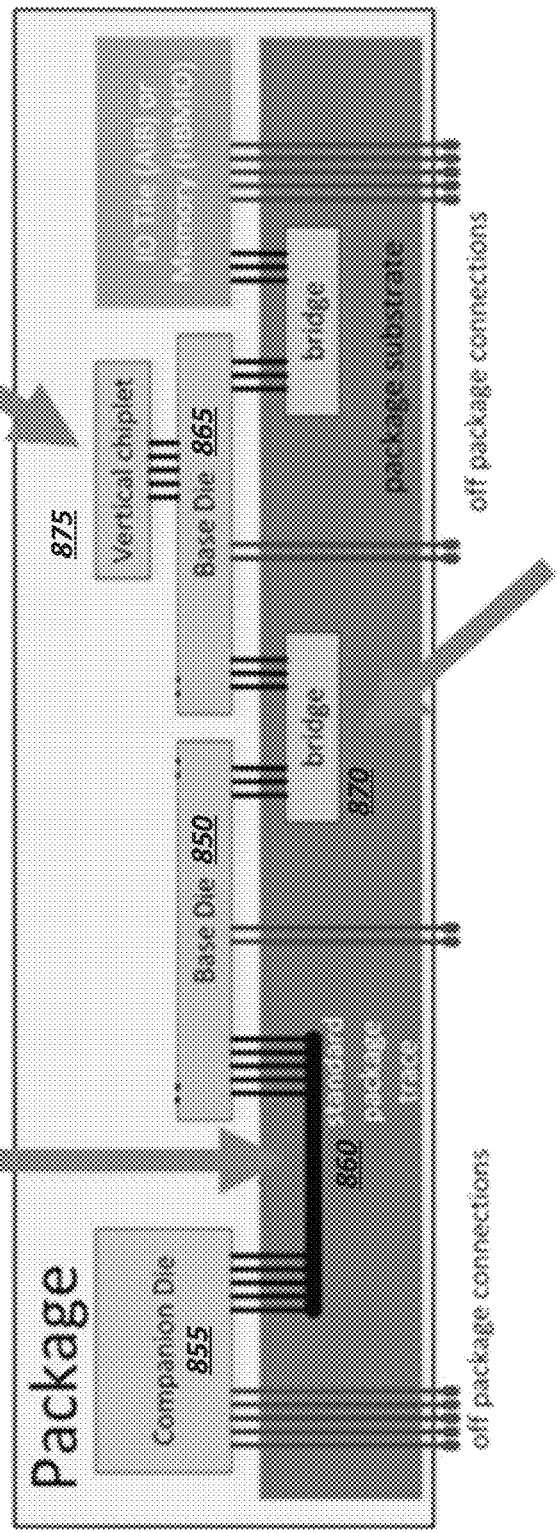

FIGS. 8A-8D are simplified block diagrams 800*a*-*d* showing example applications using a UCIe advanced (e.g., 2D) option. Such packaging technology may be used for performance optimized applications. Consequently, the channel reach is short (e.g., less than 2 mm) and the interconnect is expected to be optimized for high bandwidth and low latency with best performance and power efficiency characteristics. In one example, shown in FIG. 8A, links may be implemented on a silicon bridge 805, 810 (e.g., an Embedded Multi-die Interconnect Bridge (EMIB)). In the example of FIG. 8B, an interposer 815 on the package 710 and UCIe links (e.g., 820, 825) may be provided on the interposer 815 (e.g., in a Chip-on-Wafer-on-Substrate (CoWoS) application). In still another example of an advanced package, shown in FIG. 8C, silicon bridges (e.g., 830, 835) may be provided in a fanout organic interposer 840 which is provided on the package 710, and UCIe link may be implemented in the silicon bridges 830, 835. FIG. 8D shows another example in which a combination of standard and advanced options are employed. For instance, a base die 850 may be coupled to a companion die 855 in a 2D manner by a first link utilizing a standard package trace 860, while the base die 850 is coupled to another base die 865 by a bridge-based link 870. In another example, base die 865 couples via a 3D UCIe link to a vertical chiplet 875, among other example architectures and package applications.

Figure 9:
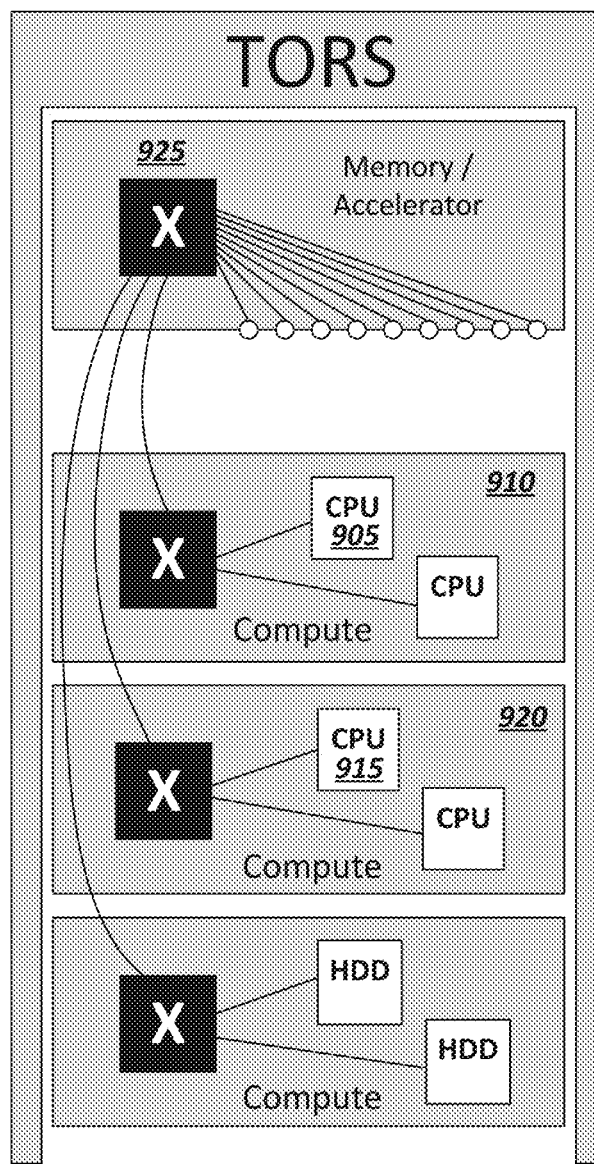
FIG. 9 is a simplified block diagram illustrating an example rack server with interconnected computing devices using a Universal Chiplet Interconnect Express (UCIe)-based protocol.

UCIe supports two broad usage models. The first usage model, as introduced above, involves package level integration to deliver power-efficient and cost-effective performance. Accordingly, components attached at the board level such as memory, accelerators, networking devices, modem, etc. can be integrated at the package level with applicability from hand-held to high-end servers with dies from multiple sources connected through different packaging options even on the same package. The second usage is to provide off-package connectivity using different types of media (e.g., optical, electrical cable, mmWave) using UCIe retimers to transport the underlying protocols (e.g., PCIe, CXL) at the rack or even the pod level for enabling resource pooling, resource sharing, and even message passing using load-store semantics beyond the node level to the rack/pod level to derive better power-efficient and cost-effective performance at the edge and data centers. FIG. 9 is a simplified block diagram showing an example rack server system (e.g., UCIe may be utilized to facilitate off-package connections, including server-scale interconnections between devices. In such implementations, retimers may be provided (e.g., a top of rack server (TORS)) on-package) to facilitate off-package connections. For instance, off-package UCIe links may be utilized to couple a device (e.g., processor device 905) on a first chassis 910 to another device (e.g., processor 915) on another second chassis 920 (e.g., via a switch device 925), among other example implementations.

Figure 10:
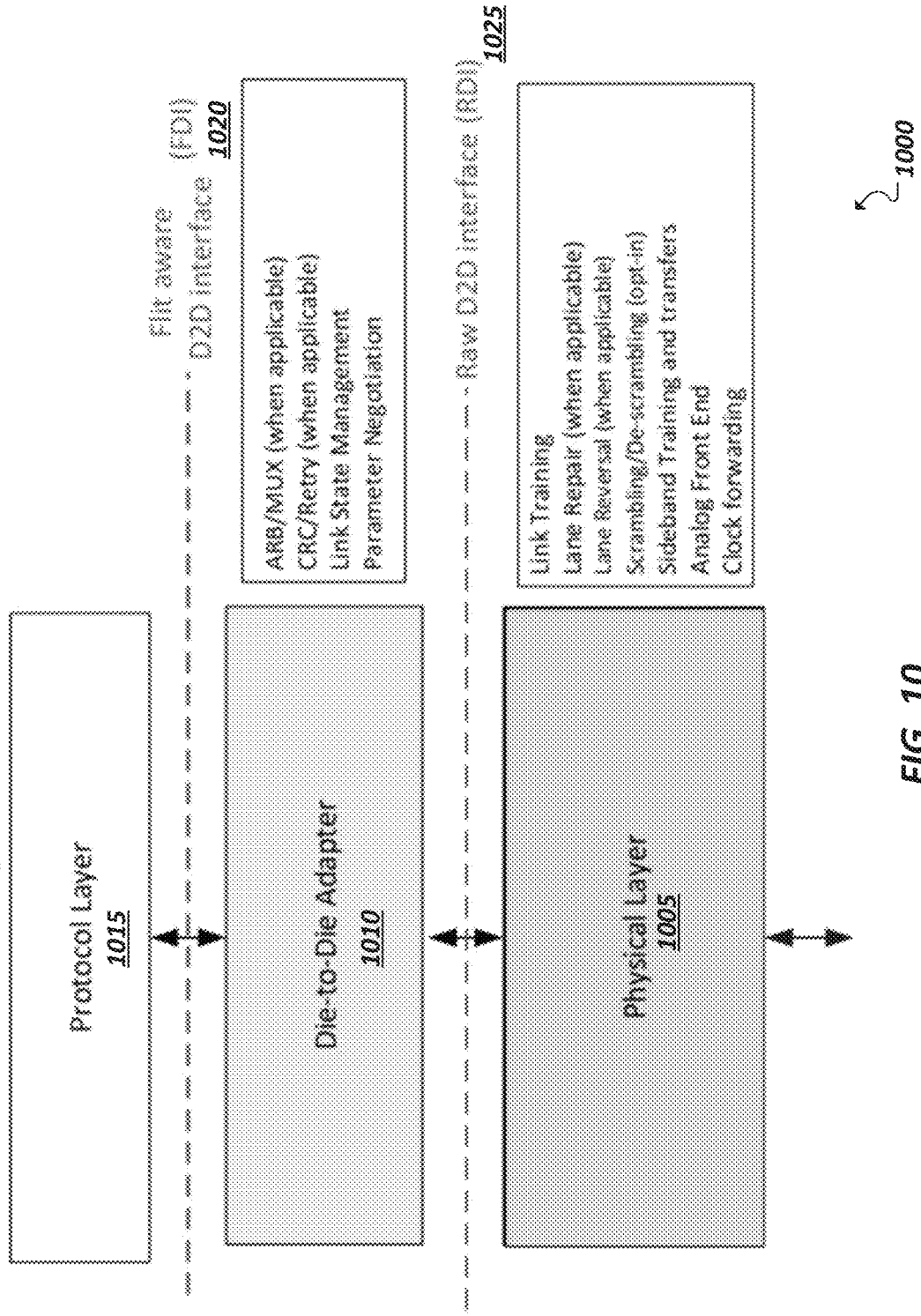
FIG. 10 is a simplified block diagram illustrating an example protocol stack of UCIe.

UCIe is a layered protocol, as illustrated in the block diagram 1000 of FIG. 10. The physical layer 1005 is responsible for the electrical signaling, clocking, link training, and sideband signaling. A die-to-die (D2D) adapter block 1010 provides the link state management and parameter negotiation for the chiplets. It optionally guarantees reliable delivery of data through its cyclic redundancy check (CRC) and link level retry mechanism. When multiple protocols are supported, the D2D adapter defines the underlying arbitration framework for arbitrating between data of the multiple protocols on the link. In one example implementation, UCIe may provide a 256-byte flit (or flow control unit) to define the underlying transfer mechanism when the adapter is responsible for reliable transfer. As noted above, one or more other interconnect protocols may be natively mapped to the flit format of UCIe. In one example, UCIe maps PCIe and CXL protocols to ensure seamless interoperability by leveraging the existing ecosystems of these protocols. For instance, with PCIe and CXL, SoC construction, link management, and security solutions that are already deployed can be leveraged to UCIe. The usage models addressed are also comprehensive: data transfer using direct memory access, software discovery, error handling, etc., are addressed with PCIe/CXL.io; the memory use cases are handled through CXL.Mem; and caching requirements for applications such as accelerators are addressed with CXL.cache, among other example benefits and use cases. UCIe also defines a "streaming protocol" which can be used to map any other protocol onto the flit format(s) defined in UCIe.

A protocol layer 1015 may be according to potentially any interconnect protocol, including protocols natively mapped to UCIe (e.g., CXL, PCIe, etc.), other well-defined or standardized interconnect protocols which can make use of UCIe's streaming or raw modes, or proprietary or vendor-defined protocols (which may likewise make use of UCIe's streaming or raw mode. The protocol layer may implement a transaction layer of the corresponding protocol, implement flow control schemes defined in the protocol, among other protocol-specific features. A logic block implementing the protocol layer 1015 (e.g., in software, firmware, and/or hardware) may interface with a UCIe D2D adapter 1010 using a flit-aware D2D interface (or FDI) 1020. The FDI interface may be defined in the UCIe protocol specification and define a set of signals for communication and negotiation between the protocol layer block 1015 and D2D adapter block 1010. For instance, signals or messages may defined in the FDI 1020 whereby the D2D adapter 1010 informs the protocol layer (e.g., based on a negotiation with a link partner device (e.g., the D2D adapter of the link partner device)) the flit format to be utilized (e.g., a mapped flit format, streaming mode flit format, raw mode flit format, etc.), which the protocol layer 1015 may use to adapt data of the corresponding protocol for the identified flit format, among other examples.

Through the provision of streaming and raw modes, UCIe allows the option of transporting data of any protocol on a UCIe link. Protocol data can be transported in flit formats, or as raw fabric wires if needed. Some protocols may be explicitly mapped, allowing for on-board components such as accelerators, memory expanders, and I/O expanders to be moved on-package seamlessly. Flit modes include operating modes where error detection and/or error correction bits/bytes (e.g., CRC) are inserted into a defined flit format by the D2D adapter. Flit modes include operating modes where a flit of another, underlying protocol of the data (e.g., PCIe, UPI, CXL, GenZ, AXI, etc.) is mapped onto the UCIe flit format, as well as a streaming mode (where data of potentially any other protocol is encoded or populated into the flit format (e.g., which includes the CRC and any other designated fields defined in the UCIe flit)). Raw mode, on the other hand, is an operating mode where all bytes of the UCIe flit are populated by the protocol layer (and the D2D adapter accepts the flit as-is without adding CRC, Retry, or other values into the flit and transfers data from the protocol layer to the physical layer without any modification). In some instances, CRC, Retry, FEC, etc. in raw mode may be handled entirely by the protocol layer (rather than the UCIe D2D adapter), among other examples.

In some implementations, a D2D adapter 1010 may be provided as a distinct block of circuitry (e.g., from that implementing the protocol layer block and/or the physical layer block 1005). In other implementations, one or both of the logic implementing of the protocol layer or the physical layer may be collocated or integrated with the logic (e.g., hardware circuitry) implementing the D2D adapter block 1010, among other example implementations. A D2D adapter 1010 coordinates with the protocol layer 1015 (e.g., via FDI 1020) and the physical layer 1005 (e.g., via raw D2D interface (RDI) 1025) to ensure successful data transfer across a UCIe link. Providing such standardized interfaces (e.g., FDI and RDI) to couple blocks (e.g., IP blocks) implementing respective layers of the protocol allows vendors and SoC builders to easily mix and match different layers from different IP providers at low integration cost and faster time to market. (e.g., enabling a Protocol Layer block to work with the D2D Adapter and Physical Layer block from any different vendor that conforms to the interface handshakes provided in this specification). Further, given that interoperability testing during post-silicon has greater overhead and cost associated with it, a consistent understanding and development of Bus Functional Models (BFMs) based on such interfaces may allow easier IP development for such UCIe protocol stack implementations, among other example benefits.

The D2D adapter 1010 helps facilitate the minimization of logic in the main data path to realize a highly latency-optimized data path for protocol flits. The D2D adapter may include logic to implement various functionality that may be leveraged by various protocols (of protocol layer 1015), such arbitration and multiplexor functionality, error detection and/or error correction codes (e.g., cyclic redundancy check (CRC)), retry scheme, among other example features. As an example, a protocol layer implementing CXL may be coupled to a D2D adapter. When transporting CXL protocol, the ARB/MUX functionality of the D2D adapter 1010 may be utilized to perform arbitration/multiplexing of the multiple sub-protocols of CXL (e.g., CXL.mem, CXL.io, CXL.cache). Error detection, error correction, retry, and other functionality provided by the D2D adapter 1010 may be utilized to support targeted bit error rate (BER) requirements (e.g., based on the speed to be implemented on the link). For instance, where the raw BER is less than 1e-27, a CRC and retry scheme may be provided by the D2D adapter 1010. Additionally, the D2D adapter 1010 may be responsible for coordinating higher level link state machine and link bring up protocols, protocol options related to parameter exchanges with remote link partner, and when supported, power management coordination with remote link partner. For instance, two link partner devices to be coupled using a UCIe link may utilize their respective D2D adapters to perform training of the link (e.g., through the progression through various link states defined in a link state machine) and determination of parameters to be used during operation of the link, among other examples.

A communication port of a computing device may be constructed from a protocol logic block, a D2D adapter block, and a physical layer block. The protocol logic block may interface with the D2D adapter block via a FDI interface and the D2D adapter may interface with the physical layer block using an RDI interface. Each of the FDI and RDI interfaces may be implemented using physical pins, traces, conductors, or other communication pathways, over which the respective signals of the defined interface may be communicated. The protocol logic block (e.g., 1015), D2D adapter block (e.g., 1010), and physical layer block (e.g., 1015) implement respective layers of the UCIe protocol and enable their device to establish a UCIe-compliant link and communicate with another link partner computing device using the UCIe protocol.

The physical layer of a UCIe stack may be implemented through a number of physical layer modules to form the physical layer of a corresponding link. The module forms the main data path (e.g., on the physical bumps or pins of the port) and is organized as a grouping of lanes. A module forms the atomic granularity for the structural design implementation of UCIe's analog front end (AFE). The number of lanes per module may be based on whether a Standard or Advanced package is utilized in the implementations. A single D2D adapter may be coupled to a physical layer implemented as one or multiple modules (for bandwidth scaling). The physical link (and each module making up the physical layer) of UCIe may include a sideband connection (made up of a first subset of the lanes) and a mainband connection made up of a second subset of the lanes of the physical layer). The mainband connection of a UCIe module/physical layer provide the main data path in UCIe. The mainband connection may include a forwarded clock, a data valid pin, and N data lanes per module. The sideband connection is used for parameter exchanges, register accesses for debug/compliance, and coordination with remote partner for link training and management. The sideband connection may include a forwarded clock pin and a data pin in each direction. In one example implementation, a forwarded clock may be fixed at a frequency of 800 MHz regardless of the main data path speed (e.g., at a different frequency than the main data path (mainband) speed). In some implementations, the sideband logic for UCIe's physical layer may be powered using auxiliary power to place the sideband logic in an "always on" domain. Each module may include its own respective set of sideband pins/bumps/lanes.

Figure 11:
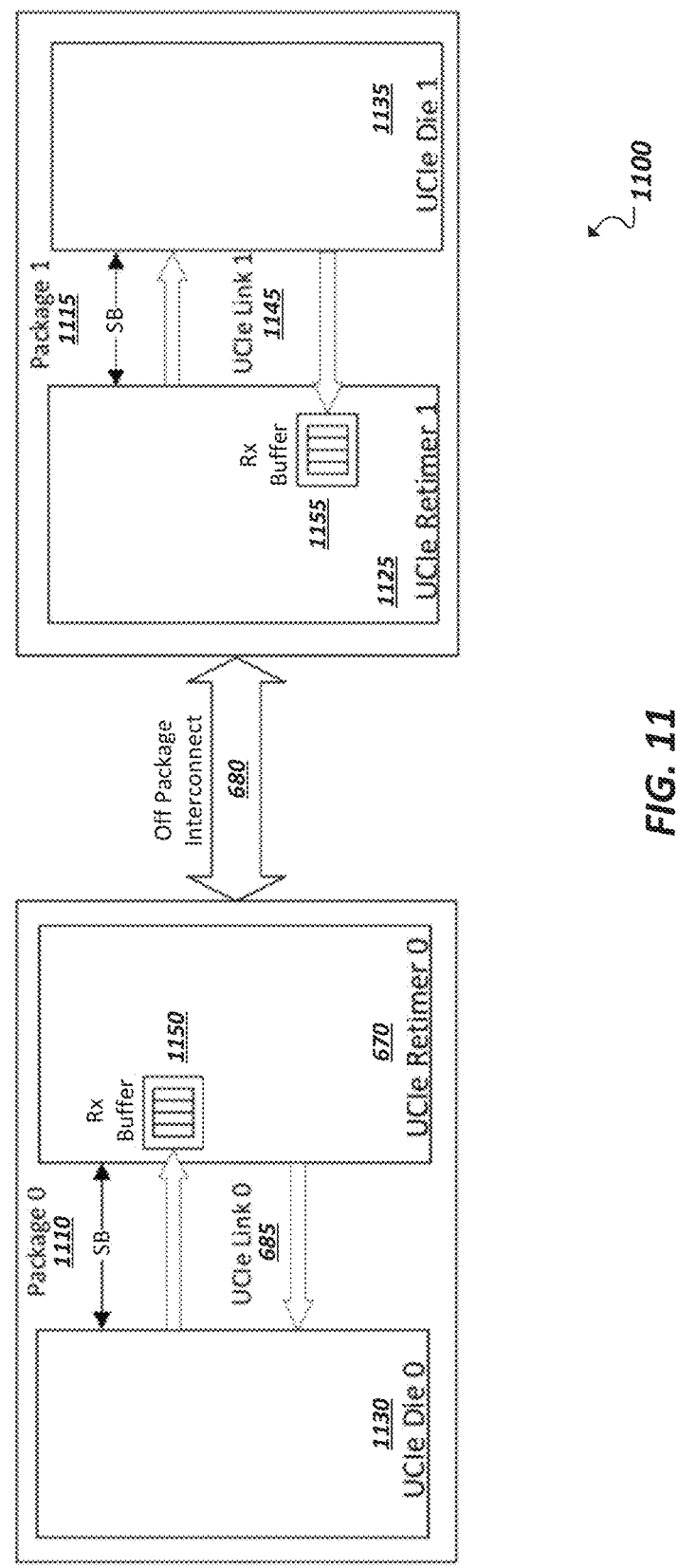
FIG. 11 is a simplified block diagram of a computing system including two packages connected by a UCIe-based interconnect.

As introduced above, retimers may be used to extend the UCIe connectivity beyond the package using off-package links (e.g., electrical or optical cable communication media), for instance, to connect packages at a rack/pod/blade level. A UCIe retimer implements the UCIe interface to the die that it connects to on its local package and ensures that the flits are delivered across the two dies on different packages in accordance with the UCIe protocol. UCIe can also be used to transport any protocol including load-store protocols such as PCIe or CXL over long-reach alternate media such as optical. Turning to FIG. 11, a simplified block diagram 1100 is shown illustrating an example system including two packages (e.g., 1110, 1115) connected by a UCIe link 680. As introduced above, UCIe retimers may be used to enable different types of off-package interconnects 680 to extend the channel reach between two UCIe dies on different packages (e.g., 1110, 1115). A respective UCIe retimer (e.g., 670, 1125) may be provided at each package to enable the off-package UCIe link (e.g., 680). Further, each package's UCIe retimer 670, 1125 may be coupled to one or more of the dies (e.g., 1130, 1135) on its package by a respective UCIe link (e.g., 685, 1145). The die (e.g., 1130, 1135) may forward data to the corresponding retimer (e.g., 670, 1125) for communication to the other die on the other package over the off-package link 680 facilitated through the retimer. Relative to the on-package link (e.g., 685) coupling the retimer (e.g., 670) to an on-package die (e.g., 1130), the off-package link may be considerably longer in physical length. The off-package retimer (e.g., 1125) to which the retimer (e.g., 670) is connected using the off-package link

680 may be referred to as the "remote retimer partner." Data (e.g., included in flits of a particular format) generated at the dies (e.g., 1130, 1135) may be forwarded by a retimer (e.g., 670, 1125) to the other retimer (e.g., 1125, 670) over the off-package link 680.

The responsibility of each UCIe retimer (e.g., 670, 1125) in an example system may include the reliable transport of flits over the off-package interconnect 680. In one example, the retimer (e.g., 670, 1125) is configured to implement and support the use of a forward error correct (FEC) and error detection (e.g., cyclic redundancy check (CRC)) natively defined by the underlying specification of the protocol it carries (e.g., PCIe or CXL) as long as the external interconnect conforms to the underlying error model (e.g., BER and error correlation) of the specification corresponding to the protocol it transports. In such an example, the UCIe links may be configured to utilize the raw mode to tunnel native bits of the protocol it transports (e.g., PCIe or CXL flits). In this scenario, the queue sizes (e.g., protocol layer buffers) are adjusted on the UCIe dies to meet the underlying round trip latency. In another example, the retimer may be configured to support and provide the defined FEC, CRC and Retry capabilities to handle the BER of the off-package interconnect. In this case, the flits undergo three independent links; each UCIe retimer performs an independent Ack/Nak for Retry with the UCIe die within its package and a separate independent Ack/Nak for Retry with the remote retimer partner. As another example, the retimer may provide its own FEC by replacing the native protocol's (e.g., PCIe- or CXL) defined FEC with its own, or adding its FEC in addition to the native protocol's defined FEC, but takes advantage of the built-in CRC and Replay mechanisms of the underlying protocol. In this example, the queue sizes (e.g., Protocol Layer buffers, Retry buffers, etc.) must be adjusted on the UCIe dies to meet the underlying round trip latency.

UCIe retimers may also be responsible for the resolution of link layer and protocol layer parameters with its remote retimer partner to ensure interoperability between UCIe dies end-to-end (E2E). For example, retimers (e.g., 670, 1125) are permitted to force the same link width, speed, protocol (including any relevant protocol specific parameters), and flit formats on both packages (e.g., 1110, 1115). The specific mechanism of resolution, including message transfer for parameter exchanges across the Off Package Interconnect, may be implementation-specific for the retimers and they work to ensure a consistent operational mode taking into account their own capabilities along with the UCIe die (e.g., 1130, 1135) capabilities on both packages (e.g., 1110, 1115). However, for robustness of the UCIe links (e.g., 685, 1145) and to avoid unnecessary timeouts in case the external interconnect 680 requires a longer time to link up or resolution of parameters with remote retimer partner, a "Stall" response may be defined to the relevant sideband messages that can potentially get delayed. The retimers can respond with the "Stall" response (e.g., according to specification-defined rules) to avoid such unnecessary timeouts while waiting for, or negotiating with, its remote retimer partner. It is the responsibility of the retimer to ensure the UCIe link is not stalled indefinitely. As another feature, UCIe retimers (e.g., 670, 1125) may be responsible for managing link states defined for the D2D adapter (e.g., an Adapter Link State Machine (LSM)) or the RDI states with its remote retimer partner to ensure correct E2E operation, among other example considerations.

Retimers may additionally provide flow control and back pressure management logic to manage data transmitted from its on-package UCIe die (e.g., 1130, 1135). For instance, data transmitted from a UCIe die to a UCIe retimer may be flow-controlled using credits. Credits used to manage this link (e.g., 685, 1145) may be in addition to any credit protocol defined for the underlying protocol of the data being sent (e.g., PRH, PRD credits in PCIe). UCIe die-to-die (D2D) credits may be defined for flow control across the two UCIe retimers and any data transmitted to the UCIe retimer is to be eventually consumed by the remote UCIe die without any other dependency. A UCIe retimer (e.g., 670, 1125) may implement a receiver (Rx) buffer (e.g., 1150, 1155) for flits it receives from the UCIe die (e.g., 1130, 1135) within its package. The receiver buffer credits are advertised to the UCIe die during initial parameter exchanges for the D2D adapter, and the UCIe die may be required to not send any data to the UCIe retimer if it does not have a credit for the transmission. In one example implementation, one credit corresponds to 256B of data (including any FEC, CRC etc.). Credit returns, in one example implementation, may be overloaded or encoded on/in the Valid framing signal. Credit counters at the UCIe die may be reassigned to initial advertised value whenever RDI states transition away from Active. A UCIe retimer may drain or dump (as applicable) the data in its receiver buffer before re-entering Active state. In some examples, data transmitted from a UCIe retimer to a UCIe die may not be flow controlled at the D2D adapter level. The UCIe retimer, instead, may have its independent flow-control with the other UCIe retimer if needed, among other example implementations.

Figure 12:
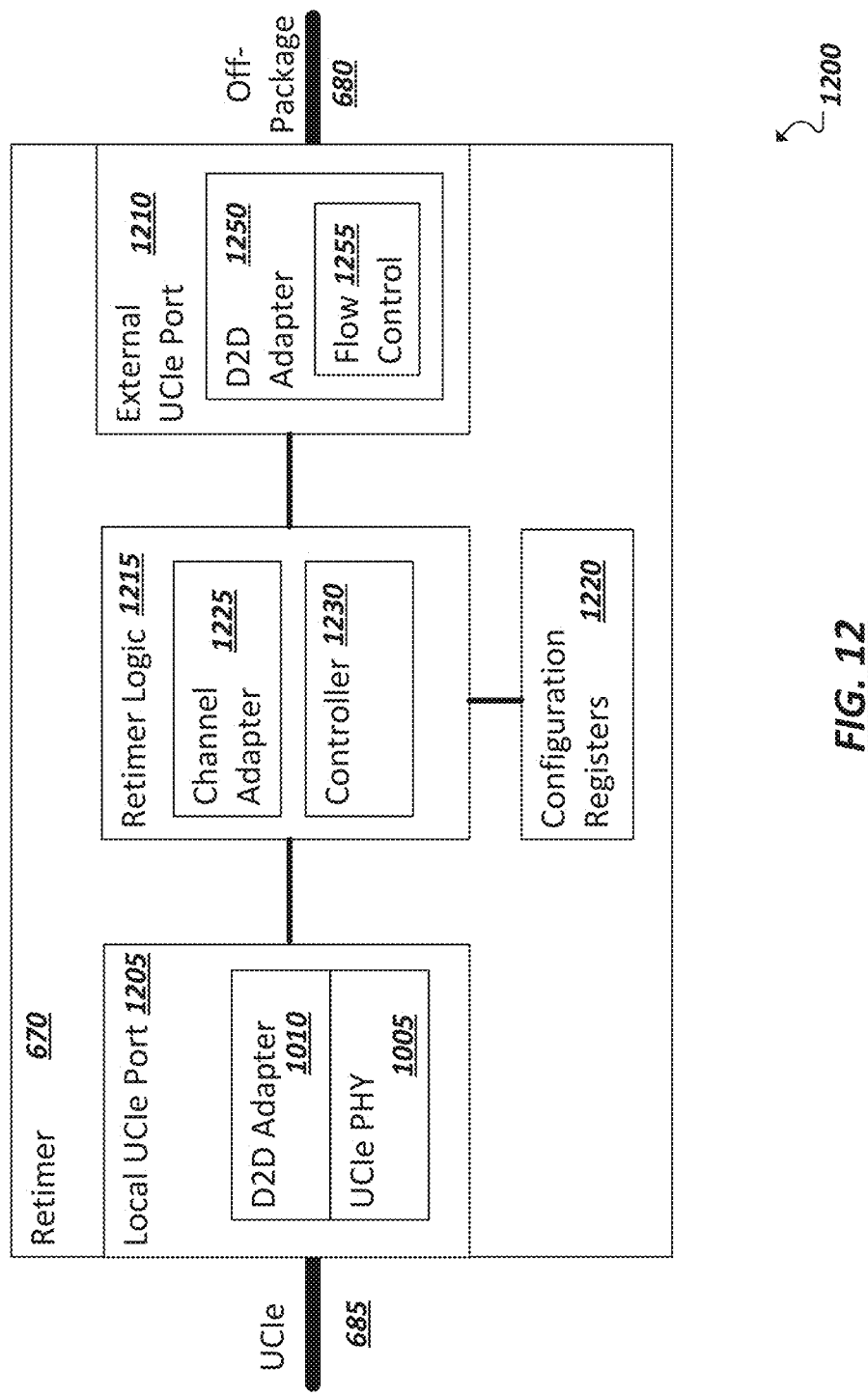
FIG. 12 is a simplified block diagram of an example retimer device.

FIG. 12 is a simplified block diagram 1200 illustrating an example UCIe retimer 670. Generally, a UCIe retimer 670 may enable adoption of UCIe protocols on larger-scale applications and system, enabling different transmission media and technologies (e.g., optical, mmWave, or electrical cables) to be utilized, beyond those technologies (e.g., electrical point-to-point interconnects with defined lane assignments and signaling characteristics) defined for use in the UCIe protocol, to physically connect different packages, including packages within applications such as automotive, Internet of Things (IoT) applications, industrial applications, rack/pod server disaggregation applications, scale-out systems, among others, while still maintaining high bandwidth. In the example illustrated in FIG. 12, an example UCIe retimer 670 may be provided with two or more ports, including at least one local UCIe port (e.g., 1205) to couple to other components (e.g., dies) on the same package via respective UCIe links (e.g., 685) and one off-package, or external, port (e.g., 1210) to implement an off-package interconnect (e.g., 680). The external port 1210 may be adapted to implement and communicate over a particular technology and corresponding protocols, such as technologies allowing high-speed, longer reach channels, such as optical or mmWave, among other examples. The external port 1210 may connect, via the off-package link 680, to the external port of another partner retimer device (e.g., on a different package). This partner retimer may, in turn, couple to one or more dies on its package, thereby facilitating die-to-die communications between the packages over the off-package link 680 and supporting retimers (e.g., 670), such as introduced in the example of FIG. 11.

Each port (e.g., 1205, 1210) of a device, including retimer devices (e.g., 670) may include circuitry, modules, or other logic implementing one or more layers of the UCIe protocol, such as outlined in the example of FIG. 10. For instance, in one example, a local UCIe port 1205 may implement a D2D adapter 1010 and UCIe PHY 1005. In some instances, the retimer 670 may not be fully protocol aware (e.g., to enable the retimer to be flexibly deployed in a variety of applications). In other instances, the retimer's port may further implement one or more protocol layers of underlying protocols to be supported by the system, among other example implementations. An external port (e.g., 1250) may also include an implementation of a D2D adapter (e.g., 1250). The D2D adapter of a retimer's external port may be specialized, or different from, typical UCIe D2D adapter in that additional functionality and associated logic and circuitry may be employed to facilitate an off-package link (e.g., 680) that is able, from both a speed and reliability standpoint, to handle data passed to it from dies coupled to the retimer (e.g., 680) via a UCIe link (e.g., 685). Such additional functionality may include, for instance, enhanced or specialized error detection and/or correction functionality (e.g., capable of bringing the off-package interconnect medium within an acceptable or compatible BER range), flit packing logic (to adapt data received on the UCIe link 685 for transmission on a different technology of the off-package link 680), and flow control functionality (e.g., implemented using flow control circuitry 1255, among other example features and logic.

Continuing with the example of FIG. 12, a retimer 670 may function to pass data received from one port (e.g., 1205, 1210) and forward the same data onto the other port (e.g., 1210, 1205) without data loss and at a speed that enables the UCIe links to continue to function in a flit-based mode of operation (e.g., where the ports continuously transmit and receive data in a stream of fixed-sized chunks, or flits). Accordingly, retimer logic 1215 may be implemented in hardware circuitry and/or firmware of the retimer 670 to facilitate the retiming of data, bidirectionally, between ports 1205, 1210. Given that the retimer 670, through its external off-package link (e.g., 680) may utilize a different transmission medium and technology than is defined or assumed for die-to-die UCIe links (e.g., 685), retimer logic 1215 may include channel adapter circuitry 1225 to modulate, reform, or otherwise adapt data from the UCIe medium (e.g., a multi-lane electrical channel) to one or more different channel types (e.g., optical, mmWave, electrical channels (e.g., Ethernet) with different widths or characteristics, etc.). A retimer 670 may include one or more configuration registers 1220 to assist in configuring and monitoring performance of the retimer 670. Such registers (e.g., 1220) may be written to and/or read by system software and may be populated or defined during training of the link(s) according to the UCIe protocol to identify the characteristics and configuration parameters of the retimer, among other example information. Register values may also be utilized by a controller (e.g., 1230) implemented in the retimer 670 to drive how the retimer and its ports (e.g., 1205, 1210) operate, based on this training and configuration, among other example uses.

Figure 13:
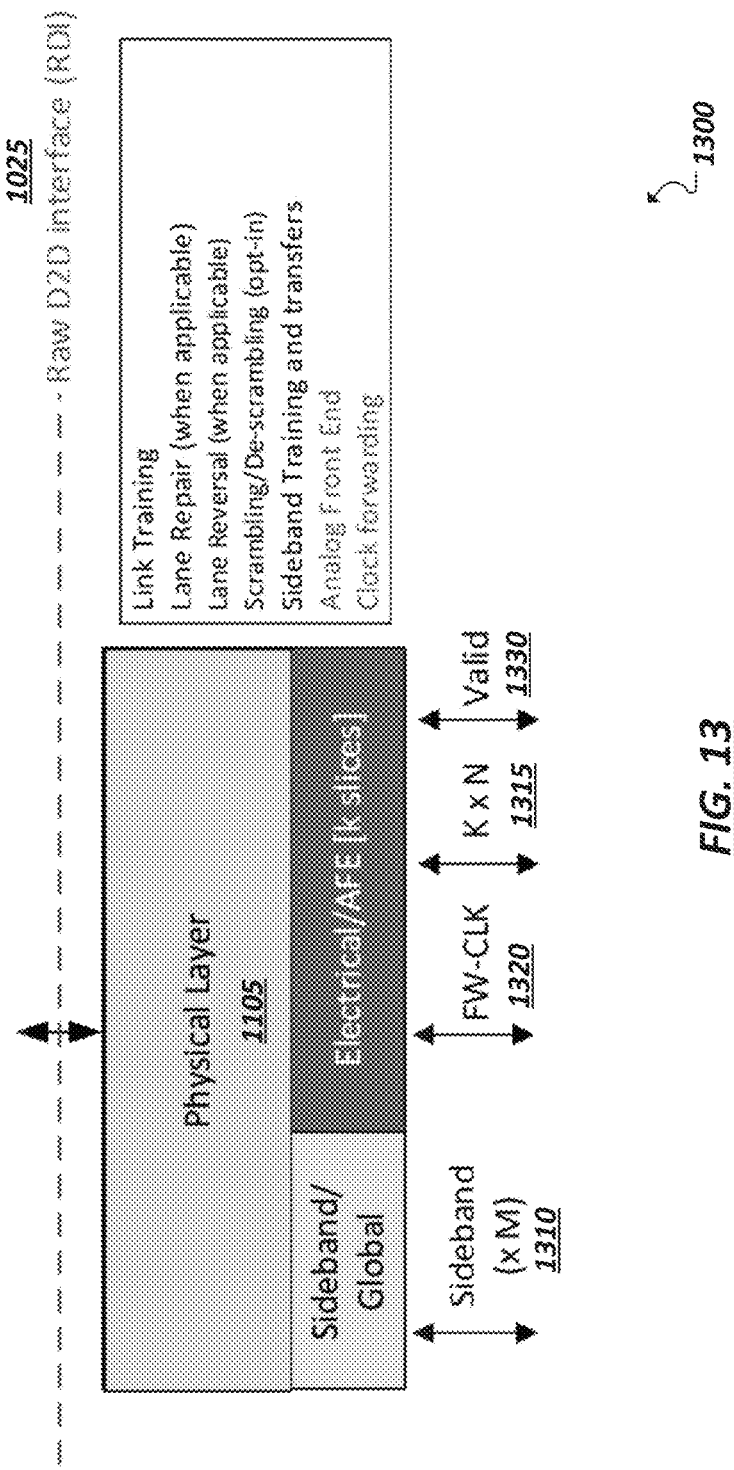
FIG. 13 is a simplified block diagram of an example physical layer block.

A retimer 670 may implement one or more instances of a UCIe PHY (e.g., 1005) in one or more of its ports (e.g., 1205). FIG. 13 is a simplified block diagram 1300 illustrating an example physical layer module of a UCIe device. The physical layer may include a logical physical layer (logical PHY) 1305, or PHY logic, and a number (M) of sideband lanes 1310 and a number (N) of mainband lanes 1315. As noted above, the mainband lanes may include one or more forward clock lanes 1320, a number of data lanes 1325, and a valid lane 1330. The logical PHY 1305 may perform link training, lane repair, lane reversal, scrambling/descrambling, sideband training and transfers, among other functions for the link. The physical layer may couple to a D2D adapter (e.g., implemented on a separate hardware or IP block) via a RDI interface 1025. Main, functional data may be communicated using mainband lanes 1315, while training and configuration data (e.g., for use in reading and writing data from retimer registers) may utilize sideband lanes (e.g., 1310). As introduced above, a physical layer for a UCIe link may be implemented using one or multiple PHY modules based on the designated width of the link to be implemented.

As introduced above, a retimer's D2D adapter may implement error detection and correction functionality for an external off-package link implemented using the retimer. In some instances, the D2D adapter may include and utilize standard UCIe error detection and correction functionality. In other instances, depending on the nature of the off-package communication channel, the speed of the link, the application, or other factors, the retimer D2D adapter may alternatively or additionally implement other, enhanced error detection and correction functionality to achieve a comparable level of reliability on the external link. As an example, the D2D adapter of a retimer may support the same FEC/CRC natively available in standard UCIe D2D adapters (e.g., based on the FEC/CRC outlined in the PCIe 6.0 specification) and utilize this error detection and correction functionality and scheme as long as the external interconnect conforms to the corresponding bit error rate (BER) thresholds (e.g., PCIe 6.0 BER rules) across the two UCIe dies (e.g., 10-6 raw BER, Flit error rate of $<=3\times10-5$). If achieving this reliability threshold is not possible using the native error detection and correction (e.g., FEC/CRC) functionality, the retimer may instead or additionally utilize other FEC, CRC, Retry, or other techniques to achieve the requisite BER characteristics for the communication channel. In a die-to-die coupling using retimers and an off-package link, flits undergo three independent links—a UCIe link from a first die to the first retimer, an off-package link from the first retimer to the second retimer, and a second UCIe link from the second retimer to the second die. Accordingly, each UCIe retimer may perform its own independent ack/nak with the UCIe die to which it is connect and perform a separate independent ack/nak with the other UCIe retimer. A UCIe retimer, in one example, may utilize a different FEC (e.g., adapted for the technology of the external channel) to meet the defined flit error rate. For instance, the retimer may add its own FEC by either removing the native FEC (e.g., PCIe/CXL FEC) or adding its own FEC on top of the PCIe/CXL FEC, while taking advantage of the built-in CRC/replay mechanism of the underlying protocol (e.g., PCIe/CXL), among other examples. In such an example, the queue sizes of the retimer receive buffer may be adapted to meet the underlying round-trip latency, among other example configurations.

Data transmitted over an off-package link maintains flit-wise transmission characteristics. Indeed, as discussed above, a retimer may reuse CRC, FEC, and other native UCIe features. Associated fields may be defined UCIe flit formats. In other application and modes (e.g., where retimer-specific CRC/FEC are used), UCIe raw mode may instead be utilized on the off-package link. FIGS. 14A-14C illustrate example flit formats that may be supported by the protocol stack implemented on external ports of UCIe retimers. For instance, FIG. 14A illustrates an example raw mode format defined in UCIe. As above, the raw mode may permit effectively any type, protocol, or format of data to be transmitted on a UCIe link. To the extent CRC, FEC, Retry, or any other features are to be employed in raw mode, the retimer may implement additional logic (e.g., in the retimer logic and/or external port circuitry) to implement these independent of the D2D adapter. In the example of FIG.

14A, a standard raw mode format 1400*a* is shown where all 64 bytes (1402) of the transmission medium are defined by the protocol layer. In advanced package configurations, a longer raw mode data format may be provided with additional bytes provided through the extra or spare lanes of an advanced package configuration. These spare lanes may be utilized to send parity data or other information. In one example, additional parity information sent on a spare lane may include 1B of parity for every 8UI of data transferred across the physical link. If parity is not enabled, or if spare lanes are not available to transmit parity, the D2D adapter can check and count CRC errors used by the underlying the UCIe specification. In the mandatory mechanism the native 256B Flit used in PCIe 6.0/CXL3.0 is used. This format may be used, for instance, for PCIe, CXL, and streaming protocols. The UCIe Retimer may replace the FEC with its own FEC in some implementations, and may use the 8B CRC and the replay mechanism of the underlying PCIe 6.0/CXL 3.0 protocol across the two UCIe dies, among other example implementations. Table 1 is represents one example of how various underlying protocols may be mapped to UCIe retimer modes, among other possible example implementations:

TABLE 1

Example Protocol-Retimer Mode Mappings in a System

| | Retimer uses FEC/CRC of PCIe 6.0/CXL 3.0 Flit | Retimer uses own FEC/CRC to meet reliability threshold |
|---|---|---|
| PCIe 6.0 Optimized (Advanced) | Not Permitted | Supported (w/SB credits) |
| PCIe 6.0 256 B Flit Raw Mode (Advanced/Organic) | Supported | Supported (retimer either uses the flit FEC/CRC or replaces with own) |
| PCIe 6.0 256 B Standard Flit (Advanced/Organic) | Not Permitted | Supported |
| CXL 3.0 Optimized (Advanced) | Not Permitted | Supported (w/SB credits) |
| CXL 3.0 Latency Optimized 256 B Flit (Advanced/Organic) | Not Permitted | Supported |
| CXL 3.0 256 B Flit (standard and latency-optimized) in Raw Mode | Supported | Supported (retimer either uses the flit FEC/CRC or replaces with own) |
| CXL 3.0 256 B Standard Flit | Supported | Supported (retimer either uses the flit FEC/CRC or replaces with own) |
| CXL 2.0 Flits Streaming Raw/Optimized/256 B- Advanced/Organic | Not Supported Permitted if the Streaming Protocol takes care of reliable transmission across packages | Not Supported Supported | protocols to help characterize the D2D link (which can especially be useful for the optical connections to characterize or debug the link which is the dominant source of errors), among other example features and functionality, which may be added by the D2D adapter even when the link is operating in raw mode. When operating in raw mode (as negotiated by the D2D adapter), flit data may be mapped as-is onto the UCIe wires, byte-by-byte (e.g., in 64B chunks shifted over time).

FIG. 14B shows representation 1400*b* of an example flit mapping in an example advanced package use case where one or more spare lanes (e.g., 1405, 1410) are available. For instance, in the example of FIG. 14A, an optimized mode for the mapping of a 256B optimized UCIe Flit is shown. Here, one spare lane 1410 is used to transmit CRC by the D2D adapter, while another spare lane 1405 is used to send flit header and credit return information. The protocol layer may present information in flits of 256B. Through this optimization, enabled by the spare lanes 1405, 1410, only TLP information (e.g., 1415, 1420, 1425, 1430) is transmitted on the main-band data path 1440. In some implementations, a retimer may wrap its specialized FEC, CRC, and/or replay data as needed. FIG. 14C illustrates an example implementation of a native 256B Flit used in PCIe 6.0/CXL 3.0 mappings. In this example, 2B in the first 64B of data are reserved for populating with information from the D2D adapter, followed by 240B of flit data (1440, 1445, 1450, 1455) provided by the protocol layer and then another 14B (1460) reserved for the D2D adapter. UCIe Retimers may support these example formats among others, as defined in The technology utilized in an off-package communication channel supported by a retimer may support data rates, or frequencies, below, at, or higher than those utilized in the standard UCIe link channels (e.g., as defined for a UCIe PHY). To facilitate a die-to-die coupling over an off-package link, the die partners negotiate a particular bandwidth and frequency and expect the other die partner to match these same characteristics. Accordingly, the retimers (e.g., during training of the links) are tasked with maintaining this agreed-upon frequency in their management of the off-package link to preserve the correct functioning of the overall coupling of the two dies. In some instances, the dies may send data more reliably or more quickly than the retimers are able to forward the data over the off-package link. Accordingly, the retimers may each implement flow control schemes to further assist in reliable data transmissions, while preserving flit-based encoding of the link. For instance, a flit-level flow-control mechanism may be implemented for the transmitted flits in the UCIe die-to-UCIe retimer direction with the units being a flit. The UCIe retimer can throttle the UCIe die as needed (e.g., to provide cycles for the retimer to perform its own link management tasks (e.g., FEC, frequency conversion, sideband messaging, etc.).

In one example, each retimer may implement a credit-based flow control scheme for transmitted flits in the UCIe die-to-UCIe retimer direction (e.g., based on the Rx FIFO buffer of the retimer). In one example, each credit may correspond to a single (e.g., 256B) flit. The UCIe retimer may utilize a FIFO for which it provides credits to its local UCIe die. This may be tracked using a credit counter at the D2D adapter of the die (to correspond to buffers in the retimer die) and is applied on top of the other protocol level credits that may be implemented based on the underlying protocol of the die's protocol layer. The UCIe retimer can throttle the UCIe die through the use of these credits. In one example implementation, credit checks may be required in order to send any flits between the die and retimer (e.g., even null flits may not be sent if the die is out of credits). Other throttling mechanisms may also or alternatively be employed, including the use of null flits or other flits designed to backpressure the link at a flit-wise level (e.g., when no credits are currently available).

Figure 15:
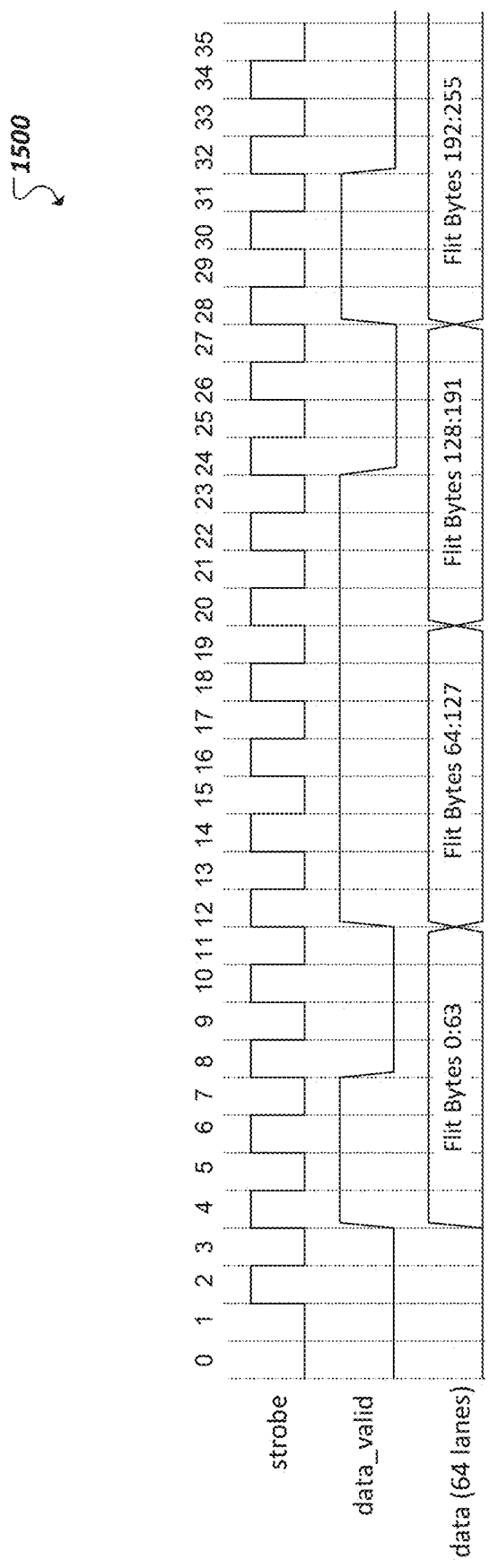
FIG. 15 is an example signaling diagram for lanes of an example UCIe link.

Turning to FIG. 15, a signal diagram 1500 is shown illustrating an example scheme for releasing retimer credits used for flow control in an UCIe retimer, such as introduced above. In one example implementation, credit releases (or returns) may be overlaid on the valid signal provided in the mainband portion of the UCIe PHY. For instance, a valid signal asserted on the valid pin 1330 may indicate that the next 64 bytes received on the data pins 1315 constitute valid data. In one example, rather than asserting the valid signal for the 8 UI corresponding to the 64 bytes, a valid signal for the 64 bytes may be asserted for only the first 4 UI to indicate the validity of data on the data lanes 1315. Accordingly, the remaining 4 UI of the valid signal may be utilized for credit releases. As one example implementations, encodings may be defined for the valid signal, which provide guaranteed triple bit flip detection and allow encoding of credit releases as follows:

1111_1111: Flit data transfer valid+1 Credit release (e.g., as in valid signal 1505)
1111_0000: Flit data transfer valid+no credit release (e.g., as in valid signals 1510, 1515, 1520)
0000_1111: No Flit data transfer+1 credit release
0000_0000: No Flit data transfer+no credit release)

In some instances, any error may trigger the retraining of the link retrain, the local UCIe die loses all flit credits released to it, and the UCIe retimer then re-releases credits for the remaining FIFO entries. In some implementations, there may be no implementation of explicit local flow-control for the local UCIe retimer to UCIe die at the D2D adapter level. Any error in the valid signal may cause the link to go through recovery and retraining. The UCIe retimer releases only the credits for the space available in its FIFO buffer. All flits that have been acknowledged locally by the UCIe retimer remain in the retimer FIFO and should be guaranteed transmittal by the retimer over the off-package link to the UCIe retimer on the other package. In some instances, credit counters may be reinitialized to their originally advertised value, rather than requiring explicit credit returns at the flit- or transaction-level, among other example implementations.

Figure 16A:
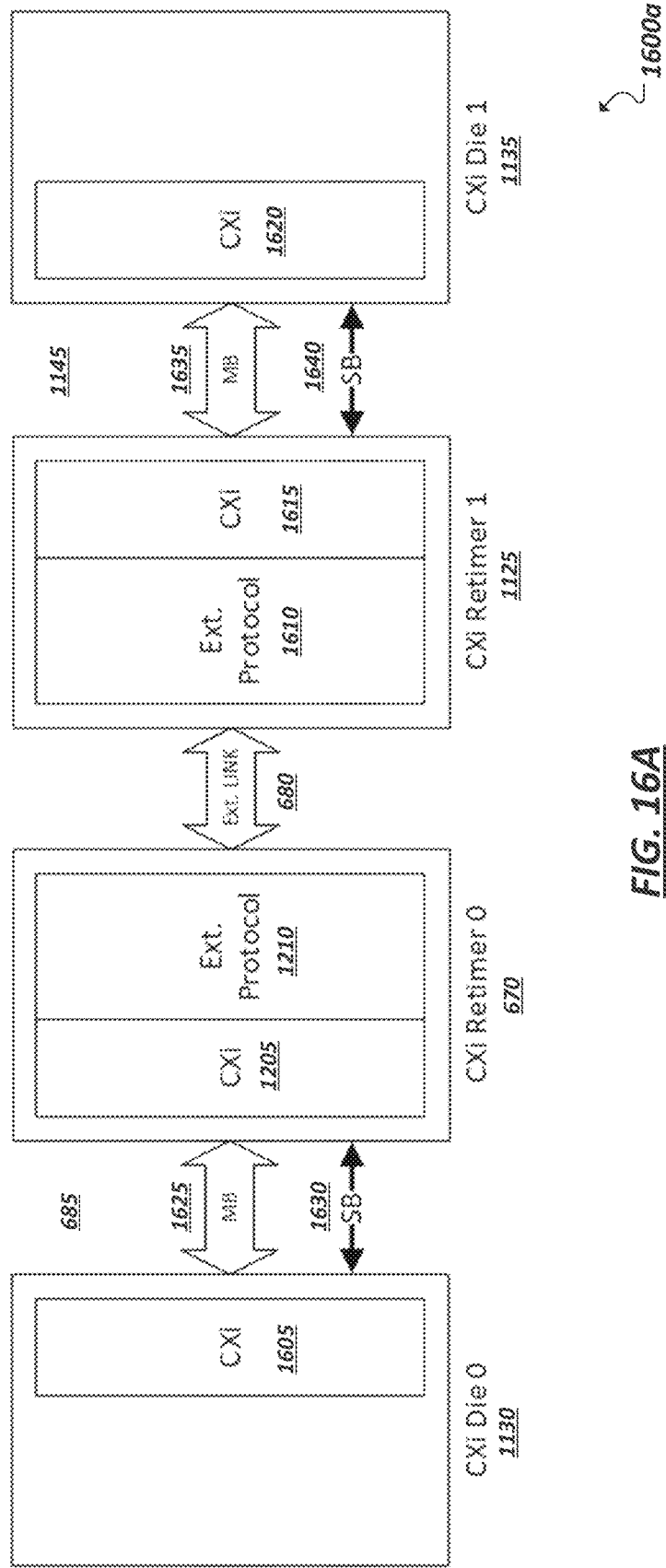
FIG. 16A is a simplified block diagram of an example communication channel including an external link facilitated by example retimer devices.

Turning to FIG. 16A, a simplified block diagram 1600a is shown of an example system including a first UCIe die 1130 connected to a first UCIe retimer 670 by a first UCIe link 685. The first UCIe retimer 670 is connected to an off-package second UCIe retimer 1125 by an off-package, external link 680, the second UCIe retimer 1125 connected to a second UCIe die 1135 via a second UCIe link 1145. The dies' UCIe ports (e.g., 1605, 1620) and the local ports (e.g., 1205, 1615) of the retimers may each implement UCIe PHYs for the local links 685, 1185, including mainband lanes (e.g., 1625, 1635) and sideband lanes (e.g., 1630, 1640). The D2D adapters of the dies 1130, 1135 may communicate with one another using the sideband channels 1630, 1640, which are carried over the external link 680 by the retimers 670, 1125, to negotiate characteristics of the link and perform training of the three links 685, 680, 1145 that make up the communication channel between the dies 1130, 1135.

Figure 16B:
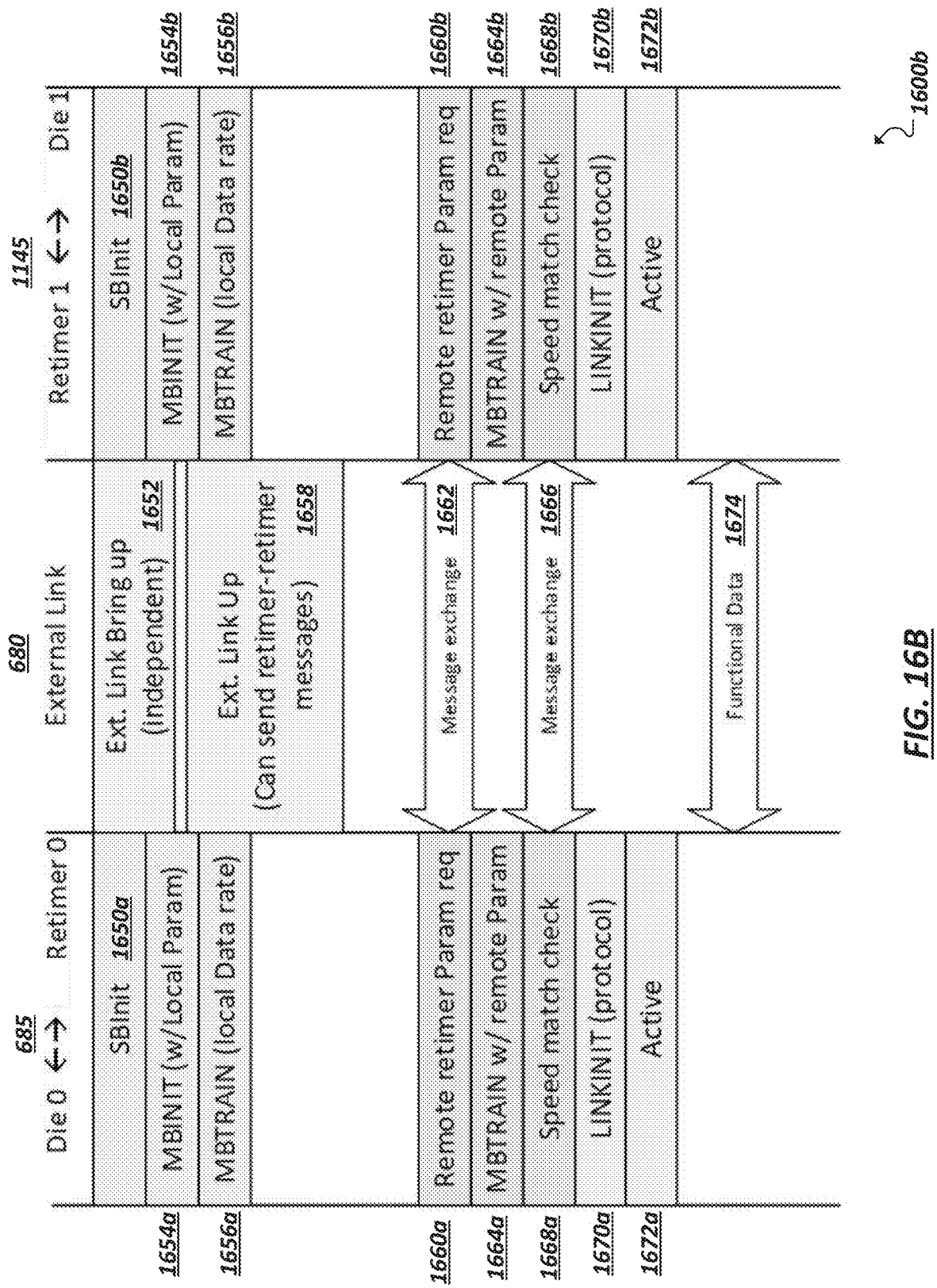
FIG. 16B is a simplified flowchart showing an example initialization of a link.

FIG. 16B illustrates a flow diagram illustrating an example flow for establishing the communication channel and the composite links 680, 685, 1145. The local UCIe links (e.g., 685, 1145) coupling local dies to local retimers may be brought up through initialization 1650a-b of the sideband communication channels of the respective links 685, 1145. With the sideband channel established the local dies and retimers may utilize the sideband channel to perform initialization 1654a-b (e.g., to establish parameters of the local link (e.g., 685, 1145)) and training 1656a-b of the local link (e.g., to establish the data rate of the local links). The external link 680 coupling the retimers may be brought up 1652 independently of (e.g., before, after, or in parallel with) the local links 685, 1145. Once established (at 1658) the external link 680 may be utilized to enable retimer-to-retimer communications, which, in turn, enables the off-package dies to communicate with one another and determine the appropriate end-to-end parameters to be applied to the overall communication channel coupling the dies via the external link 680. Accordingly, in one implementation, the D2D adapters of the remote dies may exchanges messages 1662 to communicate and negotiate respective remote retimer parameters 1660a-b. During these message exchanges (e.g., 1662, 1666, etc.), it the responsibility of the retimer to negotiate state transitions with its remote retimer partner and make sure the different UCIe die are in sync and do not timeout waiting for a response. As an example, if UCIe Die 0 sends an Active Request message for the Adapter LSM to UCIe Retimer 0, UCIe Retimer 0 must resolve with UCIe Retimer 1 that an Active Request message has been forwarded to UCIe Die 1 and that UCIe Die 1 has responded with an Active Status message before responding to UCIe Die 0 with an Active Status message, among other examples. Along the same lines, the external, off-package interconnect is not taken to a low power state unless all the relevant states on UCIe Die 0 and UCIe Die 1 have reached the corresponding low power state With these parameters established 1660a-b, each die can further train (or retrain) its mainband channel 1664a-b based on these negotiated retimer parameters. Additional messages 1666 may be communicated between the remote D2D adapters of the dies to establish and match (at 1668a-b) the overall speed of the channel. If there is a data rate difference between the two local links 685, 1145, each local UCIe link 685, 1145 may be retrained to achieve a speed (data rate) match. When speed (data rate) match is achieved, each UCIe link (e.g., 685, 1145) proceeds to active through protocol level link initialization (LINKINIT) 1670a-b, to bring these links 685, 1145 into an active operating state. With all three links 680, 685, 1145 active and trained, functional data 1674 may then be communicated between the two remote dies using their respective retimers (and external link 680 coupling their respective packages), among other example implementations.

Figure 17:
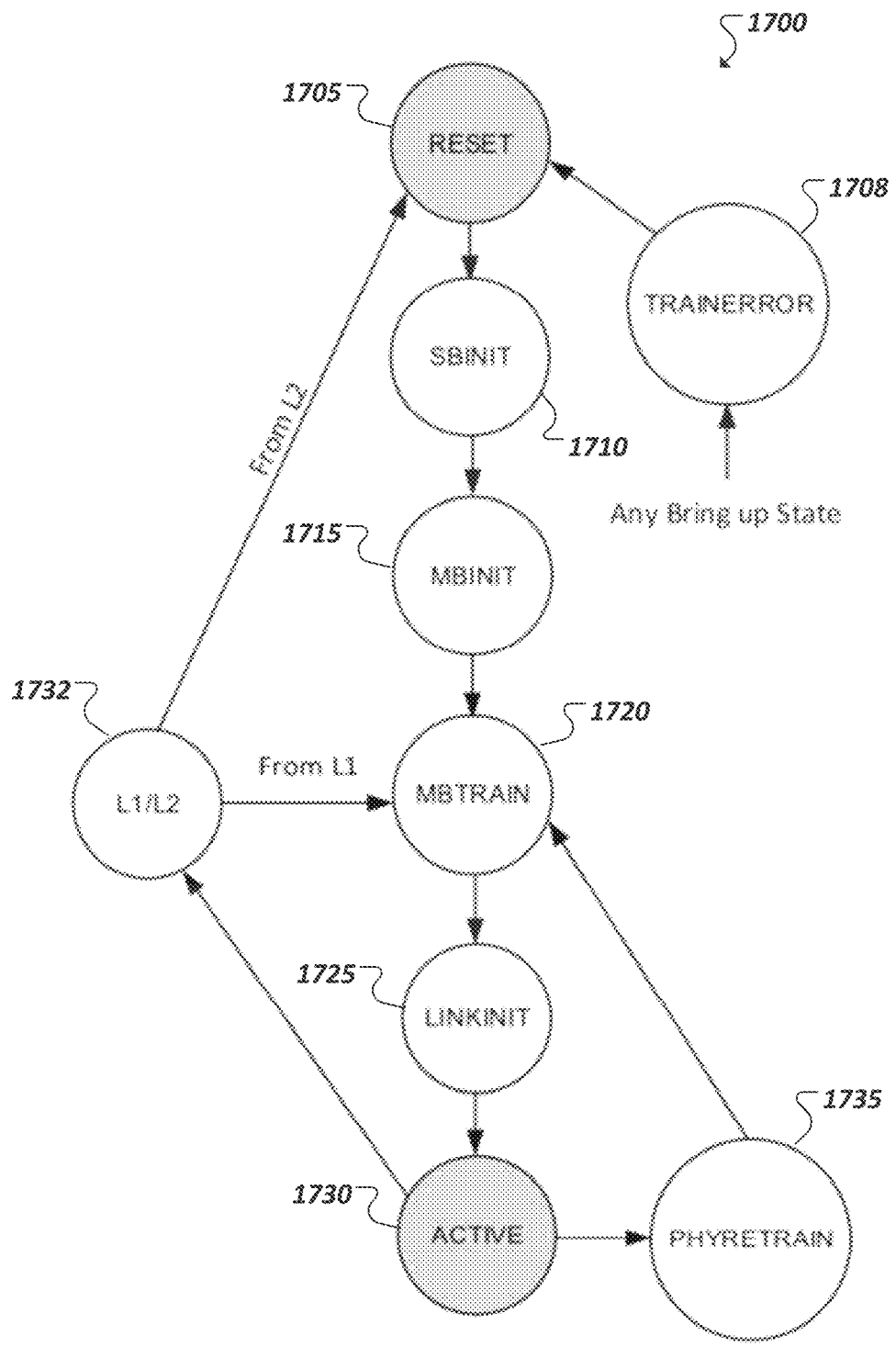
FIG. 17 is a representation of an example link state machine.

FIG. 17 is a simplified flow diagram 1700 illustrating an example state machine for initializing flow in a communication channel including an off-package, external link facilitated by two UCIe retimer devices. A reset state 1705 may be triggered at boot, startup, or in response to a training error (e.g., 1708), causing the link to be retrained, beginning with sideband initialization 1710, followed by mainband initialization 1715, and mainband training 1720. With parameters of UCIe links established, the protocol level link initialization 1725 may proceed to bring the link into an active state

1730. One or more low power states 1732 (e.g., lower power than the active state 1730), may also be provided, such as L1 and L2 low power states and may be entered from the active state 1730. An L1 state may be exited to the mainband training state 1720, while an L2 state may be exited to the reset state 1705. Should errors or faults be detected during operation, a retraining state 1735 may be entered to force retraining of the mainband (e.g., at 1720), among other example implementations of a UCIe link state machine.

Figure 18A:
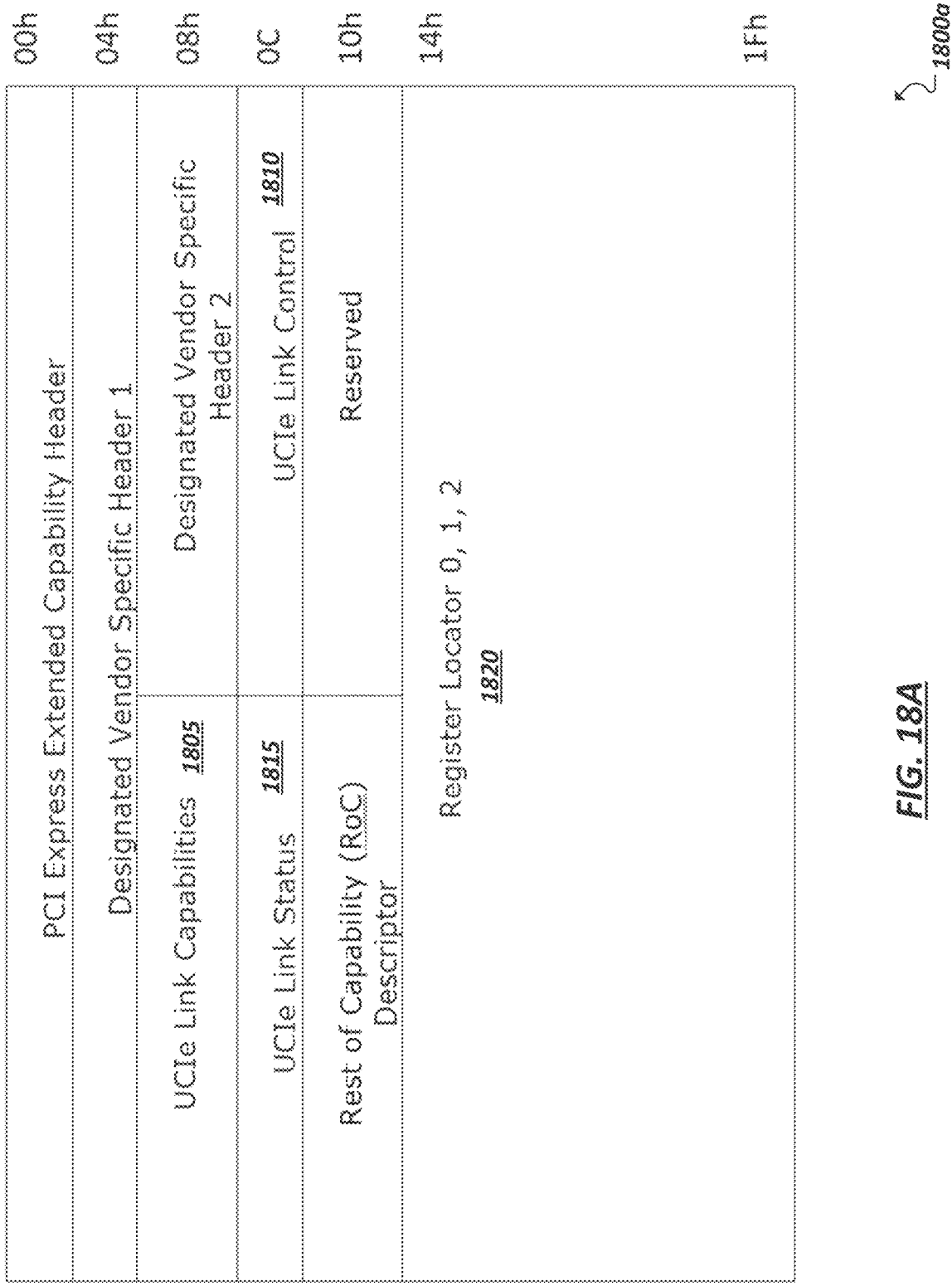

As noted above, a set of one or more registers may be associated with (and hosted on) UCIe retimer devices to assist with configuration of communication channels established using these retimer devices. The UCIe specification may define a number of registers for use in establishing and operating UCIe links. As one example, UCIe may defines one or more designated vendor-specific extended capabilities (DVSEC) registers. A UCIe link DVSEC register may be provided to serve as the basic capability register set for use in operating a UCIe link. Software may use the presence of this DVSEC register to distinguish between a UCIe device and a standard PCIe or CXL device. UCIe retimers may also implement a UCIe link DVSEC register 1800a, such as represented in FIG. 18A. UCIe Link Capabilities register 1805, Control register 1810, and Status register 1815 may contain the D2D/PHY capabilities/control/status of the retimer. The Register Locator register 1820 may provide up to three locations for adding additional registers, such as remote agent advertised link/protocol capabilities and any retimer specific registers that are not defined in the UCIe specification, among other examples. For instance, FIG. 18B illustrates an example Retimer D2D/PHY register block that can be located in any of the three register locator regions. FIG. 18C illustrates an example Retimer Test/ Compliance register block that can likewise be located in any of the three register locator regions. FIG. 18D illustrates an example Retimer implementation specific register block that may also be located in any of the three register locator regions.

Registers of a UCIe retimer may be accessed (e.g., by software) using sideband messaging on the sideband lanes of the local UCIe link. In some implementations, window registers may be provided, through which software may interact with registers of the retimer. For instance, UCIe retimer registers, in some implementations, may be directly accessible from host software. Instead, software may access the retimer registers via window registers using the sideband interface. For instance, the window registers may be available via a UCIe Link DVSEC capability register to access the UCIe retimer registers on the retimer closest to the host. For accessing UCIe Retimer registers on the far end retimer, the same window register mechanism may be available in the UCIe Link DVSEC capability of the upstream port of the other endpoint.

FIG. 19A is a representation of example window registers 1900a for use by software. The window registers may be located in the upstream or downstream component connected to the adapter of the UCIe die connected to the retimer. These window registers may be part of the standard Link DVSEC capability implemented by the upstream or downstream component. Such registers may include, as examples, a SB Mailbox address register 1905 to specifies the target register—config or memory, register locator number if its memory and the address offset, the opcode that is to be used on the side band bus, etc. Window registers may include SB Mailbox data registers (e.g., 1910) to provide the data to be written or data read from the device, a Mailbox control register (e.g., 1915) with register bits for triggering side band access, and a Mailbox semaphore register (e.g., 1920) to provides a simple mechanism for host software or a sideband debug agent to access the mailbox register set without conflicts. In some implementations, the Mailbox semaphore register may utilize a simple req/gnt protocol where only two agents can compete for the mailbox register set.

Turning to FIG. 19B a representation of a mailbox semaphore is shown. In one example implementation, each of the two agents may request ownership by writing to the Req0/1 bit. Hardware may assign ownership to one of them by setting the Gnt0/1 bit. The requesting agent polls the Gnt register to know when it has won the ownership. Once it has won arbitration, it can safely use the mailbox register set and once done it will clear the Gnt bit by writing a 1 to it. Hardware can then grant ownership to the other agent requesting it, if any. If a new agent requests ownership when someone else is owning the mailbox register, it will wait till the associated Gnt bit is clear and then it will grant ownership for the pending agent. In some implementations, the opcode that is used to access Link DVSEC is 'Cfg read/write' of width 32 bits or 64 bits. The offset to be accessed in the sideband access for cfg read/write, as shown in FIG. 19B. To access the registers pointed to by the register locator, the sideband mechanism is used and the opcode to be used for this is 'mem read/write' of width 32 bits or 64 bits. The DstID in the address used in the sideband access should point to one of three (max) register locator regions— 000 indicates register locator 0 related register block, 001 indicates register locator 1 related register block and so on.

FIG. 20 represents an example register locator register 1820. In one example, bits 5:3 2005 in the register 1820 indicate which register locator provides access to what set of additional register blocks. For example, if Register locator 0 has bits 5:3 as 0h, then by accessing the register locator 0 region, UCIe D2D/PHY related registers are accessible, among other examples.

As noted above, retimers may be utilized to implement a rack/pod-level disaggregation using a CXL 2.0 (or later) protocol. In one particular illustrative example, at the rack level, multiple compute nodes (e.g., in a virtual hierarchy) from different compute chassis connect to a CXL switch which connects to multiple CXL accelerators and/or Type-3 memory devices which can be placed in one or more separate drawers. In this example, each host may be implemented in a compute drawer and each compute drawer connects to the switch using an optical connection running CXL protocol through a UCIe-based optical tile. The switch may also have co-package optics where the optical tiles connect to the main switch die using UCIe and on the other side PCIe/CXL physical interconnects are used to connect to the accelerators/memory devices, among numerous other example implementations where UCIe links enable off-package connections.

Note that the apparatus', methods', and systems described above may be implemented in any electronic device or system as aforementioned. As specific illustrations, the figures below provide exemplary systems for utilizing the solutions as described herein. As the systems below are described in more detail, a number of different interconnects are disclosed, described, and revisited from the discussion above. While some of the examples above were based on CXL- or PCIe-based interconnects and devices, it should be appreciated that the solutions and features discussed above may be just as readily applied to other interconnect or protocol used to couple sockets, packages, boards, and the like within various computing platforms. As is readily apparent, the advances described above and UCIe-based protocols may be applied to any of the interconnects, fabrics, or architectures discussed herein, as well as other comparable interconnects, fabrics, or architectures not explicitly named or illustrated herein.

Figure 21:
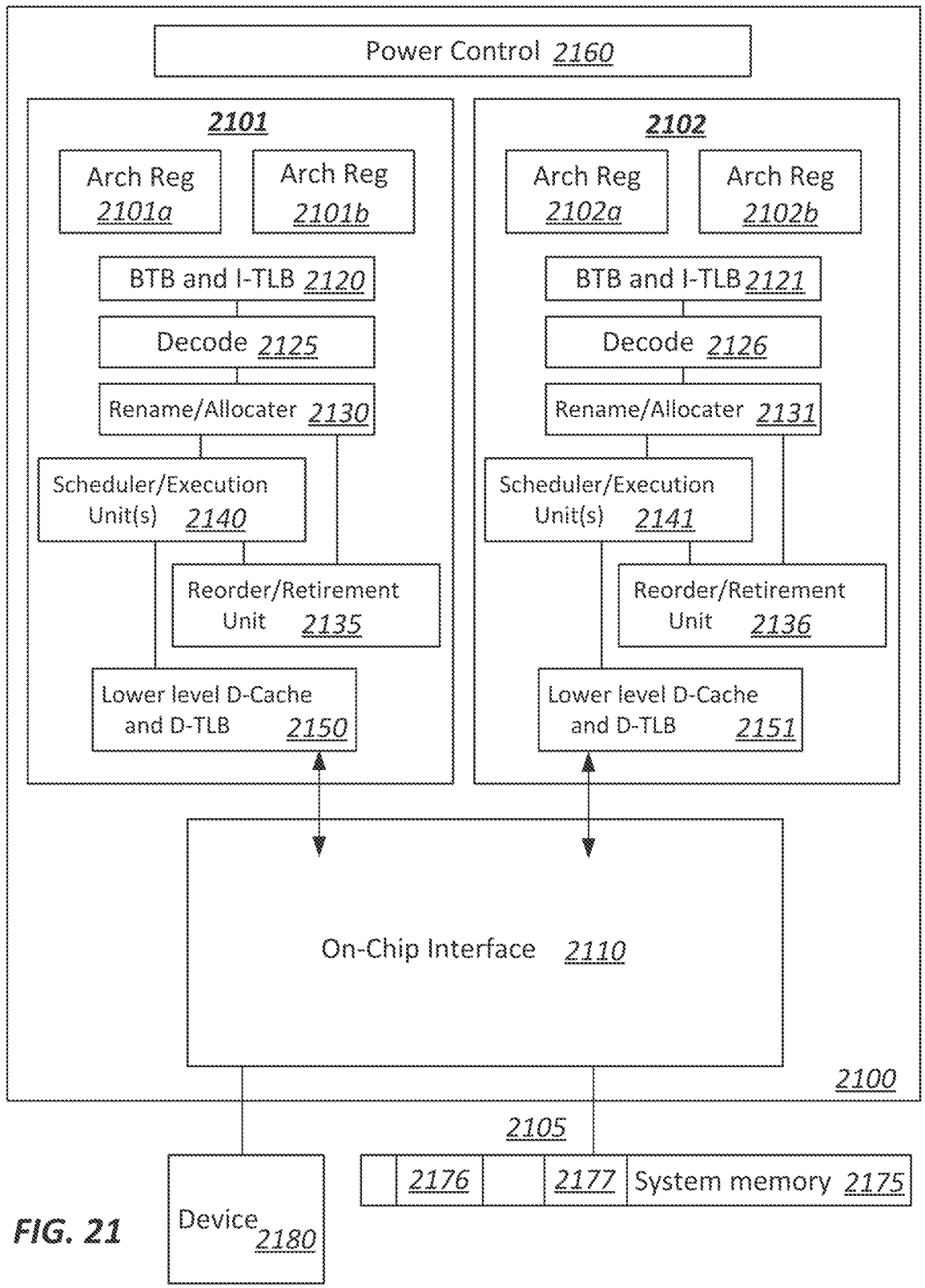
FIG. 21 illustrates an embodiment of a block diagram for a computing system including a multicore processor.

Referring to FIG. 21, an embodiment of a block diagram for a computing system including a multicore processor is depicted. Processor 2100 includes any processor or processing device, such as a microprocessor, an embedded processor, a digital signal processor (DSP), a network processor, a handheld processor, an application processor, a co-processor, a system on a chip (SOC), or other device to execute code. Processor 2100, in one embodiment, includes at least two cores—core 2101 and 2102, which may include asymmetric cores or symmetric cores (the illustrated embodiment). However, processor 2100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 2100, as illustrated in FIG. 21, includes two cores—core 2101 and 2102. Here, core 2101 and 2102 are considered symmetric cores, i.e. cores with the same configurations, functional units, and/or logic. In another embodiment, core 2101 includes an out-of-order processor core, while core 2102 includes an in-order processor core. However, cores 2101 and 2102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 2101 are described in further detail below, as the units in core 2102 operate in a similar manner in the depicted embodiment.

As depicted, core 2101 includes two hardware threads 2101a and 2101b, which may also be referred to as hardware thread slots 2101a and 2101b. Therefore, software entities, such as an operating system, in one embodiment potentially view processor 2100 as four separate processors, i.e., four logical processors or processing elements capable of executing four software threads concurrently. As alluded to above, a first thread is associated with architecture state registers 2101a, a second thread is associated with architecture state registers 2101b, a third thread may be associated with architecture state registers 2102a, and a fourth thread may be associated with architecture state registers 2102b. Here, each of the architecture state registers (2101a, 2101b, 2102a, and 2102b) may be referred to as processing elements, thread slots, or thread units, as described above. As illustrated, architecture state registers 2101a are replicated in architecture state registers 210b, so individual architecture states/contexts are capable of being stored for logical processor 2101a and logical processor 2101b. In core 2101, other smaller resources, such as instruction pointers and renaming logic in allocator and renamer block 2130 may also be replicated for threads 2101a and 2101b. Some resources, such as re-order buffers in reorder/retirement unit 2135, ILTB 2120, load/store buffers, and queues may be shared through partitioning. Other resources, such as general purpose internal registers, page-table base register(s), low-level data-cache and data-TLB 2115, execution unit(s) 2140, and portions of out-of-order unit 2135 are potentially fully shared.

Processor 2100 often includes other resources, which may be fully shared, shared through partitioning, or dedicated by/to processing elements. In FIG. 21, an embodiment of a purely exemplary processor with illustrative logical units/resources of a processor is illustrated. Note that a processor may include, or omit, any of these functional units, as well as include any other known functional units, logic, or firmware not depicted. As illustrated, core 2101 includes a simplified, representative out-of-order (OOO) processor core. But an in-order processor may be utilized in different embodiments. The OOO core includes a branch target buffer 2120 to predict branches to be executed/taken and an instruction-translation buffer (I-TLB) 2120 to store address translation entries for instructions.

Core 2101 further includes decode module 2125 coupled to fetch unit 2120 to decode fetched elements. Fetch logic, in one embodiment, includes individual sequencers associated with thread slots 2101a, 2101b, respectively. Usually core 2101 is associated with a first ISA, which defines/specifies instructions executable on processor 2100. Often machine code instructions that are part of the first ISA include a portion of the instruction (referred to as an opcode), which references/specifies an instruction or operation to be performed. Decode logic 2125 includes circuitry that recognizes these instructions from their opcodes and passes the decoded instructions on in the pipeline for processing as defined by the first ISA. For example, as discussed in more detail below decoders 2125, in one embodiment, include logic designed or adapted to recognize specific instructions, such as transactional instruction. As a result of the recognition by decoders 2125, the architecture or core 2101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 2126, in one embodiment, recognize the same ISA (or a subset thereof). Alternatively, in a heterogeneous core environment, decoders 2126 recognize a second ISA (either a subset of the first ISA or a distinct ISA).

In one example, allocator and renamer block 2130 includes an allocator to reserve resources, such as register files to store instruction processing results. However, threads 2101a and 2101b are potentially capable of out-of-order execution, where allocator and renamer block 2130 also reserves other resources, such as reorder buffers to track instruction results. Unit 2130 may also include a register renamer to rename program/instruction reference registers to other registers internal to processor 2100. Reorder/retirement unit 2135 includes components, such as the reorder buffers mentioned above, load buffers, and store buffers, to support out-of-order execution and later in-order retirement of instructions executed out-of-order.

Scheduler and execution unit(s) block 2140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 2150 are coupled to execution unit(s) 2140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 2101 and 2102 share access to higher-level or further-out cache, such as a second level cache associated with on-chip interface 2110. Note that higher-level or further-out refers to cache levels increasing or getting further way from the execution unit(s). In one embodiment, higher-level cache is a last-level data cache—last cache in the memory hierarchy on processor 2100—such as a second or third level data cache. However, higher level cache is not so limited, as it may be associated with or include an instruction cache. A trace cache—a type of instruction cache—instead may be coupled after decoder 2125 to store recently decoded traces. Here, an instruction potentially refers to a macro-instruction (i.e. a general instruction recognized by the decoders), which may decode into a number of micro-instructions (micro-operations).

In the depicted configuration, processor 2100 also includes on-chip interface module 2110. Historically, a memory controller, which is described in more detail below, has been included in a computing system external to processor 2100. In this scenario, on-chip interface 2110 is to communicate with devices external to processor 2100, such as system memory 2175, a chipset (often including a memory controller hub to connect to memory 2175 and an I/O controller hub to connect peripheral devices), a memory controller hub, a northbridge, or other integrated circuit. And in this scenario, bus 2105 may include any known interconnect, such as multi-drop bus, a point-to-point interconnect, a serial interconnect, a parallel bus, a coherent (e.g. cache coherent) bus, a layered protocol architecture, a differential bus, and a GTL bus. Bus 2105, as well as other links, interconnects, and fabrics interconnecting elements in the system of FIG. 21 may be implemented using UCIe, according to the principles discussed above. In some implementations, one or more of the elements shown in the system of FIG. 21 may be provided and interconnected on the same package. In some instances, some of the interconnected elements may be on different packages and coupled by off-package links, among other examples.

Memory 2175 may be dedicated to processor 2100 or shared with other devices in a system. Common examples of types of memory 2175 include DRAM, SRAM, non-volatile memory (NV memory), and other known storage devices. Note that device 2180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 2100. For example in one embodiment, a memory controller hub is on the same package and/or die with processor 2100. Here, a portion of the core (an on-core portion) 2110 includes one or more controller(s) for interfacing with other devices such as memory 2175 or a graphics device 2180. The configuration including an interconnect and controllers for interfacing with such devices is often referred to as an on-core (or un-core configuration). As an example, on-chip interface 2110 includes a ring interconnect for on-chip communication and a high-speed serial point-to-point link 2105 for off-chip communication. Yet, in the SOC environment, even more devices, such as the network interface, co-processors, memory 2175, graphics processor 2180, and any other known computer devices/interface may be integrated on a single die or integrated circuit to provide small form factor with high functionality and low power consumption.

In one embodiment, processor 2100 is capable of executing a compiler, optimization, and/or translator code 2177 to compile, translate, and/or optimize application code 2176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 22:
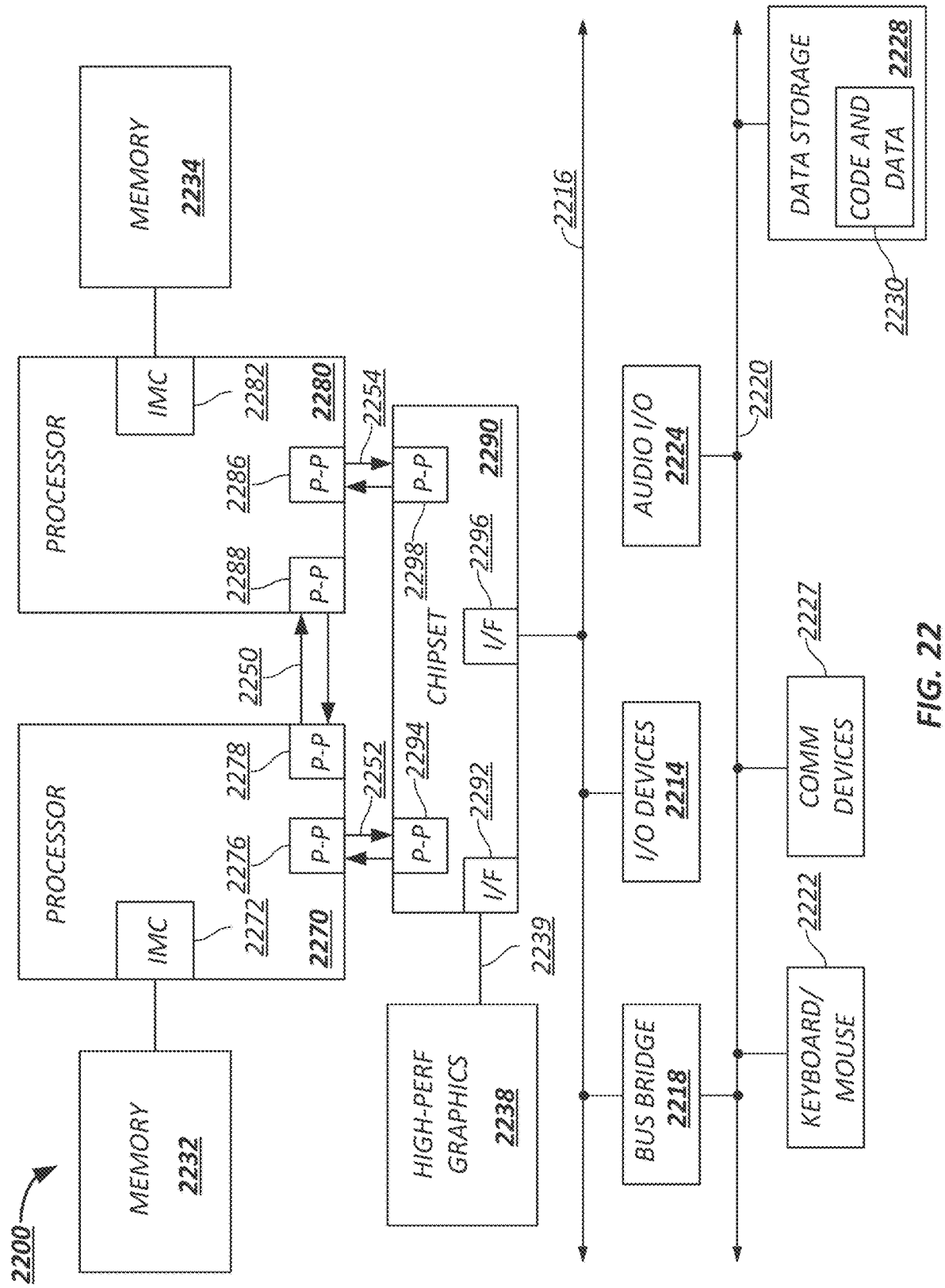
FIG. 22 illustrates an embodiment of a block for a computing system including multiple processors.

Referring now to FIG. 22, shown is a block diagram of a second system 2200 in accordance with an embodiment of the present disclosure. As shown in FIG. 22, multiprocessor system 2200 is a point-to-point interconnect system, and includes a first processor 2270 and a second processor 2280 coupled via a point-to-point interconnect 2250. Links, buses, interconnects, and fabrics interconnecting elements in the system may be implemented using UCIe, according to the principles discussed above. In some implementations, one or more of the elements shown in the system of FIG. 22 may be provided and interconnected on the same package. In some instances, some of the interconnected elements may be on different packages and coupled by off-package links, among other examples. Each of processors 2270 and 2280 may be some version of a processor. In one embodiment, 2252 and 2254 are part of a serial, point-to-point coherent interconnect fabric, such as a high-performance architecture. As a result, the solutions described herein may be implemented within a UPI or other architecture.

While shown with only two processors 2270, 2280, it is to be understood that the scope of the present disclosure is not so limited. In other embodiments, one or more additional processors may be present in a given processor.

Processors 2270 and 2280 are shown including integrated memory controller units 2272 and 2282, respectively. Processor 2270 also includes as part of its bus controller units point-to-point (P-P) interfaces 2276 and 2278; similarly, second processor 2280 includes P-P interfaces 2286 and 2288. Processors 2270, 2280 may exchange information via a point-to-point (P-P) interface 2250 using P-P interface circuits 2278, 2288. As shown in FIG. 22, IMCs 2272 and 2282 couple the processors to respective memories, namely a memory 2232 and a memory 2234, which may be portions of main memory locally attached to the respective processors.

Processors 2270, 2280 each exchange information with a chipset 2290 via individual P-P interfaces 2252, 2254 using point to point interface circuits 2276, 2294, 2286, 2298. Chipset 2290 also exchanges information with a high-performance graphics circuit 2238 via an interface circuit 2292 along a high-performance graphics interconnect 2239.

A shared cache (not shown) may be included in either processor or outside of both processors; yet connected with the processors via P-P interconnect, such that either or both processors' local cache information may be stored in the shared cache if a processor is placed into a low power mode.

Chipset 2290 may be coupled to a first bus 2216 via an interface 2296. In one embodiment, first bus 2216 may be a Peripheral Component Interconnect (PCI) bus, or a bus such as a PCI Express bus or another third generation I/O interconnect bus, although the scope of the present disclosure is not so limited.

As shown in FIG. 22, various I/O devices 2214 are coupled to first bus 2216, along with a bus bridge 2218 which couples first bus 2216 to a second bus 2220. In one embodiment, second bus 2220 includes a low pin count (LPC) bus. Various devices are coupled to second bus 2220 including, for example, a keyboard and/or mouse 2222, communication devices 2227 and a storage unit 2228 such as a disk drive or other mass storage device which often includes instructions/code and data 2230, in one embodiment. Further, an audio I/O 2224 is shown coupled to second bus 2220. Note that other architectures are possible, where the included components and interconnect architectures vary. For example, instead of the point-to-point architecture of FIG. 22, a system may implement a multi-drop bus or other such architecture.

While the solutions discussed herein have been described with respect to a limited number of embodiments, those skilled in the art will appreciate numerous modifications and variations therefrom. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosures.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform example embodiments herein may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a retimer comprising:
a first port comprising circuitry to support a first communication technology, wherein the first port is to couple to a die over a first interconnect, the first interconnect comprises a defined set of lanes and utilizes the first communication technology, and the die is located on a first package with the retimer; and
a second port comprising circuitry to support a second communication technology, wherein the second port is to couple to another retimer over a second interconnect, the second interconnect utilizes a different second communication technology, and the second retimer is located on a different, second package.

2. The apparatus of claim 1, wherein the second communication technology enables a longer physical reach than the first communication technology.

3. The apparatus of claim 1, wherein the first port comprises a die-to-die adapter and physical layer circuitry, the die-to-die adapter is to ensure successful data transfer across the first interconnect.

4. The apparatus of claim 3, wherein the defined set of lanes comprises a set of main-band lanes to implement a main data path of the link and a set of sideband lanes to carry data for use in training and management of the link, and the physical layer circuitry comprises:
a first number of sideband conductors to correspond to the set of sideband lanes; and
a second number of main-band conductors to correspond to the set of main-band lanes, wherein the set of main-band lanes comprise a forwarded clock lane, a valid lane, and a plurality of data lanes.

5. The apparatus of claim 1, wherein the second retimer connects to a second die on the second package via a third interconnect, and the first die and second die are to be communicatively coupled via a communication channel comprising the first interconnect, the second interconnect, and the third interconnect.

6. The apparatus of claim 5, wherein the retimer is to communicate with the second retimer to force a same configuration of the communication channel on the first and second packages.

7. The apparatus of claim 6, wherein the same configuration comprises one or more of a same link width, a same speed, or a same flit format used on both the first and second packages for the communication channel.

8. The apparatus of claim 1, wherein a flit with a format defined according to a particular underlying protocol is to be received at the first port from the first die, the retimer is to forward data of the flit to the second retimer over the second interconnect.

9. The apparatus of claim 8, wherein the format defines inclusion of one or more of error detection information or error correction information in the flit, and the retimer is to include other error detection information or other error correction information in the data forwarded to the second retimer based on the second communication technology.

10. The apparatus of claim 8, wherein the format is selected from a plurality of different flit formats supported by the first die, and the plurality of different flit formats comprise a Peripheral Component Interconnect Express (PCIe) flit format, a Compute Express Link (CXL) flit format, and a raw mode format.

11. The apparatus of claim 1, wherein the retimer further comprises a receive buffer, and flow control circuitry to implement a flow control scheme for flits transmitted to the retimer from the first die on the first interconnect.

12. The apparatus of claim 11, wherein the flow control scheme comprises providing credits to the first die, each of the credits corresponds to a single flit, and flits are not to be sent from the first die to the retimer without a corresponding credit.

13. The apparatus of claim 1, wherein the second communication technology comprises one of optical or mmWave.

14. A method comprising:
receiving a flit at a first retimer on a first package, wherein the flit is received from a die on the first package via a first link, the first link is implemented using a first technology and comprises a set of sideband lanes and a separate set of mainband lanes;
preparing data of the flit to be transmitted over a second link to a second retimer on a second package, wherein the second link is implemented using a different, second technology; and
sending the data of the flit from the first retimer to the second retimer on the second link.

15. The method of claim 14, wherein the data is prepared by the retimer to maintain a reliability level for transfer of flits using the second technology.

16. The method of claim 15, wherein the reliability level is maintained on the first link using a first forward error correction scheme and the reliability level is maintained on the second link using a second, different forward error correction scheme.

17. The method of claim 14, further comprising:
initializing the second link;
receiving link configuration information over the set of sideband lanes from the die; and
forwarding the link configuration information over the second link for use by a second die coupled to the second retimer by a third link to facilitate a negotiation of common configurations for the first and third links by the die and second die.

18. A system comprising:
a first device package comprising:
a first die; and
a first retimer comprising:
a first port to couple to the first die over a first die-to-die link, wherein the first die-to-die link comprises a defined set of lanes and utilizes a first communication technology; and
a second port to couple to a second retimer over an off-package interconnect, wherein the off-package interconnect utilizes a different second communication technology, and the second retimer is located on a different, second device package.

19. The system of claim 18, further comprising the second device package, wherein the second device package comprises:
a second die; and
the second retimer, wherein the second retimer is coupled to the second die by a second die-to-die link,
wherein the first die and the second die are communicatively coupled via the first die-to-die link, the off-package interconnect, and the second die-to-die link.

20. The system of claim 19, wherein the first device package and the second device package are included in a server computing system.

* * * * *